US009717978B2

(12) United States Patent
Doerksen et al.

(10) Patent No.: US 9,717,978 B2
(45) Date of Patent: Aug. 1, 2017

(54) RIDER DETECTION SYSTEM

(71) Applicant: Future Motion, Inc., Santa Cruz, CA (US)

(72) Inventors: Kyle Jonathan Doerksen, Santa Cruz, CA (US); Daniel Wood, Camas, WA (US); Julian de la Rua, Santa Cruz, CA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 15/275,067

(22) Filed: Sep. 23, 2016

(65) Prior Publication Data

US 2017/0007911 A1    Jan. 12, 2017

Related U.S. Application Data

(63) Continuation of application No. 14/934,024, filed on Nov. 5, 2015, now Pat. No. 9,452,345.

(Continued)

(51) Int. Cl.
*A63C 17/12* (2006.01)
*A63C 17/01* (2006.01)
(Continued)

(52) U.S. Cl.
CPC ............. *A63C 17/12* (2013.01); *A63C 17/01* (2013.01); *A63C 17/014* (2013.01); *A63C 17/08* (2013.01);
(Continued)

(58) Field of Classification Search
CPC ....... A63C 17/12; A63C 17/26; A63C 17/014; A63C 2203/12; A63C 17/01; A63C 17/08;
(Continued)

(56) References Cited

U.S. PATENT DOCUMENTS

| 1,585,258 A | 5/1926 | Moore |
|---|---|---|
| 4,109,741 A | 8/1978 | Gabriel |

(Continued)

FOREIGN PATENT DOCUMENTS

| TW | 450823 B | 8/2001 |
|---|---|---|
| WO | 2009071879 A9 | 6/2009 |

OTHER PUBLICATIONS

"FRS 101", Sensitronics LLC. "The Dynamics of Touch".*
(Continued)

*Primary Examiner* — Mussa A Shaawat
*Assistant Examiner* — Michael Kerrigan
(74) *Attorney, Agent, or Firm* — Kolisch Hartwell, P.C.

(57) ABSTRACT

An electric vehicle may comprise a board including deck portions each configured to receive a foot of a rider, and a wheel assembly disposed between the deck portions. A motor assembly may be mounted to the board and configured to propel the electric vehicle using the wheel assembly. At least one orientation sensor may be configured to measure orientation information of the board, and at least one pressure-sensing transducer may be configured to determine rider presence information. A motor controller may be configured to receive the orientation information and the rider presence information, and to cause the motor assembly to propel the electric vehicle based on the orientation and presence information.

20 Claims, 19 Drawing Sheets

Related U.S. Application Data

(60) Provisional application No. 62/075,658, filed on Nov. 5, 2014.

(51) Int. Cl.

| | | |
|---|---|---|
| *A63C 17/26* | (2006.01) | |
| *B62D 51/02* | (2006.01) | |
| *A63C 17/08* | (2006.01) | |
| *B60L 11/00* | (2006.01) | |
| *B62D 37/00* | (2006.01) | |

(52) U.S. Cl.
CPC ............ *A63C 17/26* (2013.01); *B60L 11/00* (2013.01); *B62D 37/00* (2013.01); *B62D 51/02* (2013.01); *A63C 2203/12* (2013.01); *A63C 2203/24* (2013.01); *B60L 2200/14* (2013.01)

(58) Field of Classification Search
CPC .. A63C 2203/24; B60L 11/00; B60L 2200/14; B62D 37/00; B62D 51/02
See application file for complete search history.

(56) References Cited

U.S. PATENT DOCUMENTS

| | | |
|---|---|---|
| 4,795,181 A | 1/1989 | Armstrong |
| 5,119,277 A | 6/1992 | Copley et al. |
| 5,487,441 A | 1/1996 | Endo et al. |
| 5,794,730 A | 8/1998 | Kamen |
| 6,050,357 A | 4/2000 | Staelin et al. |
| 6,223,104 B1 | 4/2001 | Kamen et al. |
| 6,288,505 B1 | 9/2001 | Heinzmann et al. |
| 6,332,103 B1 | 12/2001 | Steenson, Jr. et al. |
| 6,408,240 B1 | 6/2002 | Morrell et al. |
| 6,536,788 B1 | 3/2003 | Kuncz et al. |
| 6,538,411 B1 | 3/2003 | Field et al. |
| 6,553,271 B1 | 4/2003 | Morrell |
| 6,561,294 B1 | 5/2003 | Kamen et al. |
| 6,779,621 B2 | 8/2004 | Kamen et al. |
| 6,789,640 B1 | 9/2004 | Arling et al. |
| 6,827,163 B2 | 12/2004 | Amsbury et al. |
| 6,874,591 B2 | 4/2005 | Morrell et al. |
| 6,965,206 B2 | 11/2005 | Kamen et al. |
| 6,992,452 B1 | 1/2006 | Sachs et al. |
| 7,091,724 B2 | 8/2006 | Heinzmann et al. |
| 7,130,702 B2 | 10/2006 | Morrell |
| 7,138,774 B2 | 11/2006 | Negoro et al. |
| 7,157,875 B2 | 1/2007 | Kamen et al. |
| 7,172,044 B2 | 2/2007 | Bouvet |
| 7,198,280 B2 | 4/2007 | Hara |
| 7,263,453 B1 | 8/2007 | Gansler et al. |
| D551,592 S | 9/2007 | Chang et al. |
| 7,424,927 B2 * | 9/2008 | Hiramatsu ............ A63C 17/004 180/21 |
| 7,467,681 B2 | 12/2008 | Hiramatsu |
| 7,479,097 B2 | 1/2009 | Rosborough et al. |
| 7,740,099 B2 | 6/2010 | Field et al. |
| 7,757,794 B2 | 7/2010 | Heinzmann et al. |
| 7,789,174 B2 | 9/2010 | Kamen et al. |
| 7,811,217 B2 | 10/2010 | Odien |
| 7,857,088 B2 | 12/2010 | Field et al. |
| 7,900,725 B2 | 3/2011 | Heinzmann et al. |
| 7,962,256 B2 * | 6/2011 | Stevens .................. B62K 3/007 180/167 |
| 7,963,352 B2 | 6/2011 | Alexander |
| 7,979,179 B2 | 7/2011 | Gansler |
| 8,146,696 B2 | 4/2012 | Kaufman |
| 8,170,780 B2 | 5/2012 | Field et al. |
| 8,467,941 B2 | 6/2013 | Field et al. |
| 8,490,723 B2 | 7/2013 | Heinzmann et al. |
| 8,562,386 B2 | 10/2013 | Carlson et al. |
| 8,682,487 B2 | 3/2014 | Kurth et al. |
| 9,101,817 B2 | 8/2015 | Doerksen |
| 9,400,505 B2 | 7/2016 | Doerksen |
| 2005/0241864 A1 | 11/2005 | Hiramatsu |
| 2007/0194558 A1 | 8/2007 | Stone et al. |
| 2007/0254789 A1 | 11/2007 | Odien |
| 2008/0294094 A1 | 11/2008 | Mhatre et al. |
| 2011/0309772 A1 | 12/2011 | Forgey |
| 2013/0175943 A1 | 7/2013 | Tackett |
| 2013/0206493 A1 | 8/2013 | Larson et al. |
| 2015/0107922 A1* | 4/2015 | Bigler .................... A63C 17/12 180/181 |

OTHER PUBLICATIONS

"Vent Filter Temish Capseal", Nitto.*
Sep. 21, 2016, Office action from the U.S. Patent and Trademark Office, in U.S. Appl. No. 15/184,906, which is another application of Applicant Future Motion, Inc.
Ben Smither, Balancing Scooter / Skateboard:, video, retrieved Sep. 22, 2016 from https://www.youtube.com/watch?v=HGbbag9dkIU, uploaded to YouTube on Mar. 4, 2007.
www.electricunicycle.com, "Leviskate self-balancing one-wheel skateboard", video, retrieved Sep. 22, 2016 from https://www.youtube.com/watch?v=462Jj1xSSqc, uploaded to YouTube on Aug. 5, 2007.
John Xenon, "One wheel self balancing skateboard Ver2 Jan. 2009. #2", video, retrieved Sep. 22, 2016 from https://www.youtube.com/watch?v=8RPFNUsuW78, uploaded to YouTube on Jan. 3, 2009.
Rodger Cleye, "Leviskate (Balancing Skateboard) in Operation", video, retrieved Sep. 22, 2016 from https://www.youtube.com/watch?v=eN2J8m_E0go, uploaded to YouTube on Apr. 18, 2013.
Jul. 23, 2014, Office action from the U.S. Patent and Trademark Office, in U.S. Appl. No. 14/266,641, which is another application of Applicant Future Motion, Inc.
Aug. 6, 2014, Office action from the U.S. Patent and Trademark Office, in U.S. Appl. No. 14/266,641, which is another application of Applicant Future Motion, Inc.
Sep. 11, 2014, International Search Report of the International Searching Authority from the U.S. Receiving Office, in PCT Patent Application PCT/US2014/036244, which is an international application of Future Motion, Inc.
Sep. 11, 2014, Written Opinion of the International Searching Authority from the U.S. Receiving Office, in PCT Patent Application PCT/US2014/036244, which is an international application of Applicant Future Motion, Inc.
Oct. 29, 2014, Office action from the U.S. Patent and Trademark Office, in U.S. Appl. No. 14/266,641, which is another application of Applicant Future Motion, Inc.
Dec. 17, 2014, final Office action from the U.S. Patent and Trademark Office, in U.S. Appl. No. 14/266,641, which is another application of Applicant Future Motion, Inc.
Feb. 12, 2015, Office action from the U.S. Patent and Trademark Office, in U.S. Appl. No. 14/266,641, which is another application of Applicant Future Motion, Inc.
Sep. 30, 2015, Office action from the U.S. Patent and Trademark Office, in U.S. Appl. No. 14/805,044, which is another application of Applicant Future Motion, Inc.
Nov. 10, 2015, International Preliminary Report on Patentability from the International Bureau of WIPO in PCT Patent Application PCT/US2014/036244, which is an international application of Applicant Future Motion, Inc.
Jan. 27, 2016, International Search Report of the International Searching Authority from the U.S. Receiving Office, in PCT Patent Application PCT/US2015/059332, which is an international application of Applicant Future Motion, Inc. that shares the same priority as this U.S. application.
Jan. 27, 2016, Written Opinion of the International Searching Authority from the U.S. Receiving Office, in PCT Patent Application PCT/US2015/059332, which is an international application of Applicant Future Motion, Inc. that shares the same priority as this U.S. application.
Jan. 29, 2016, Office action from the U.S. Patent and Trademark Office, in U.S. Appl. No. 14/934,024, which shares the same priority as this U.S. application.

(56) References Cited

OTHER PUBLICATIONS

Nitto Denko Temish® Venting System S-NTF Series Products Data Sheet, circa before Nov. 5, 2014.

* cited by examiner

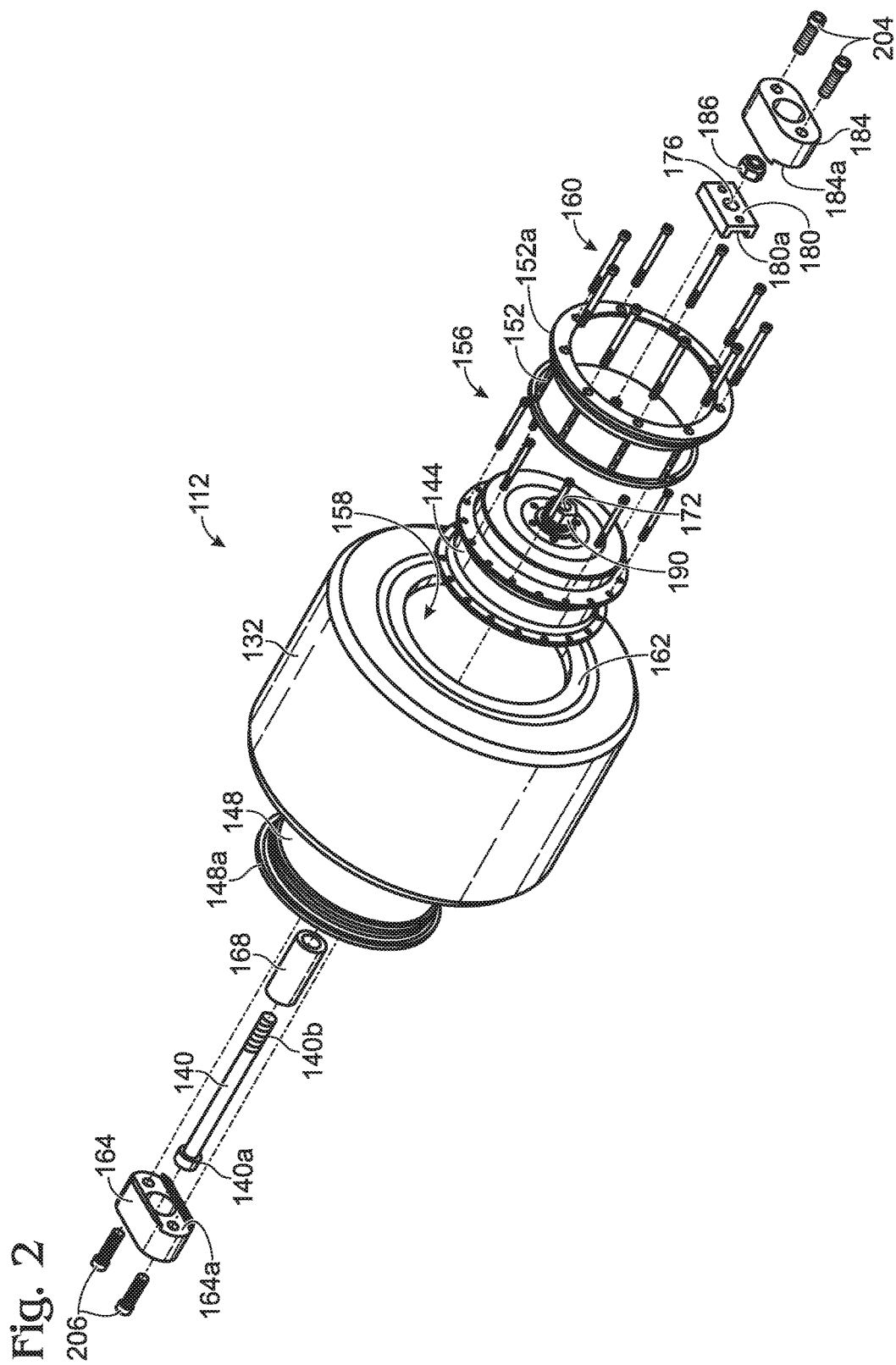

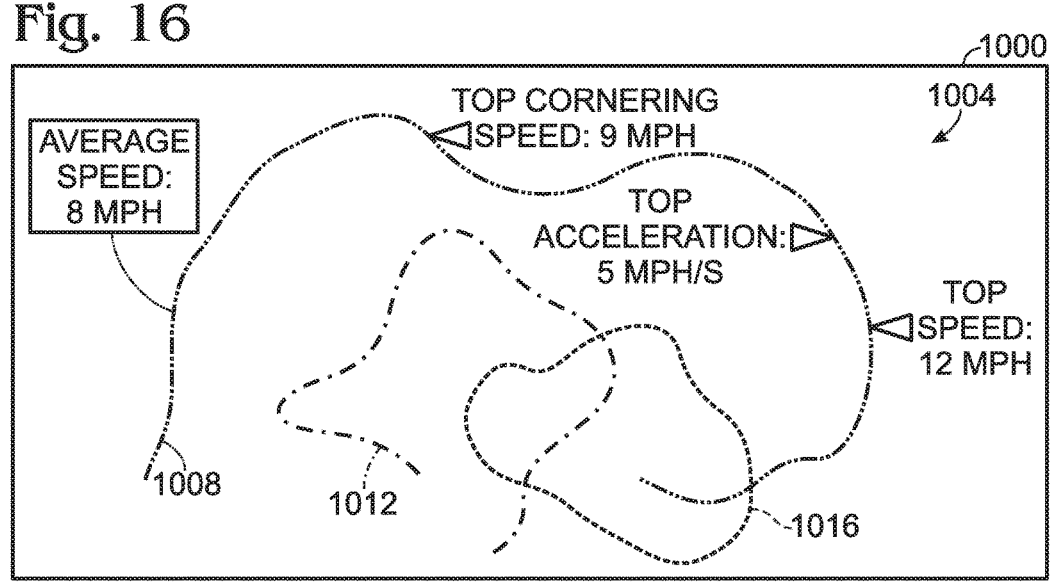
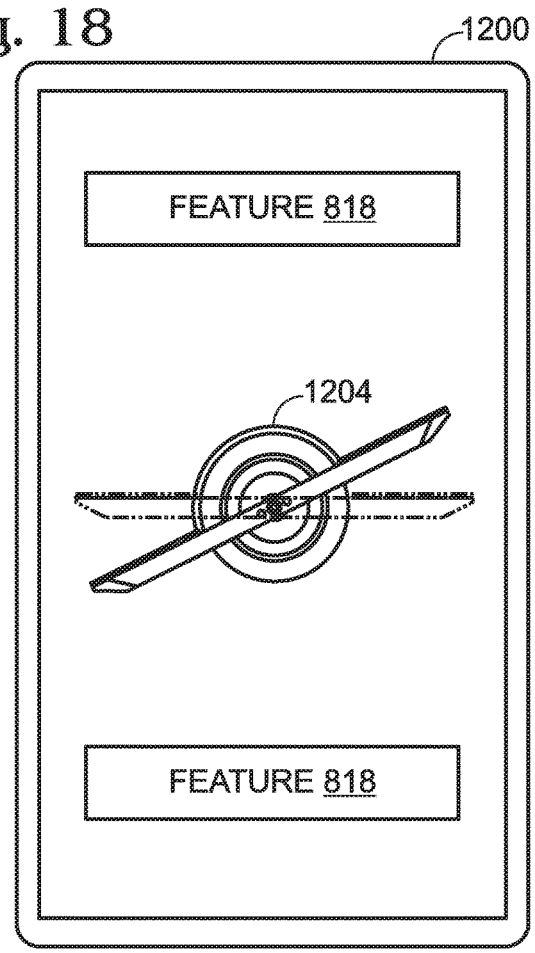

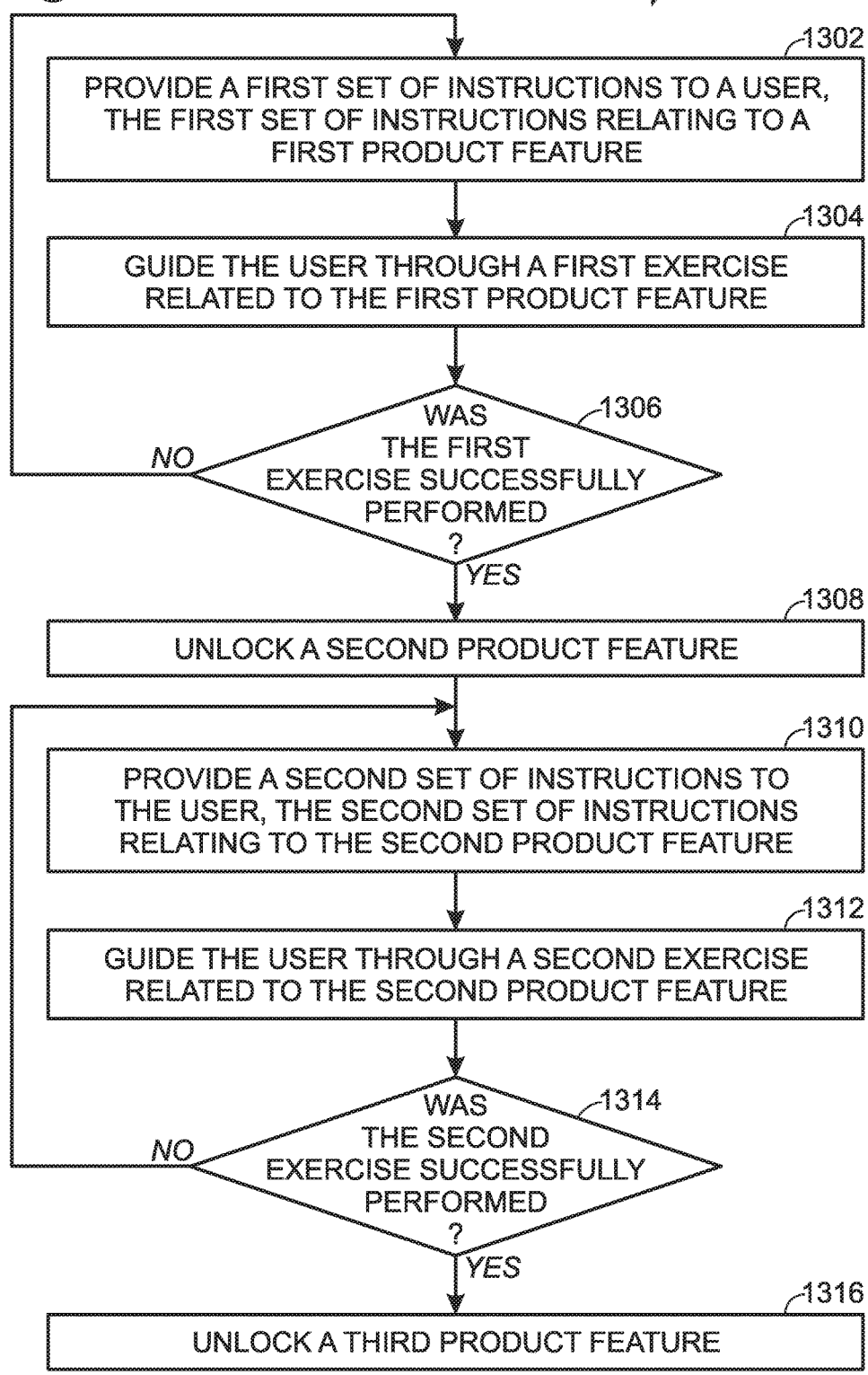

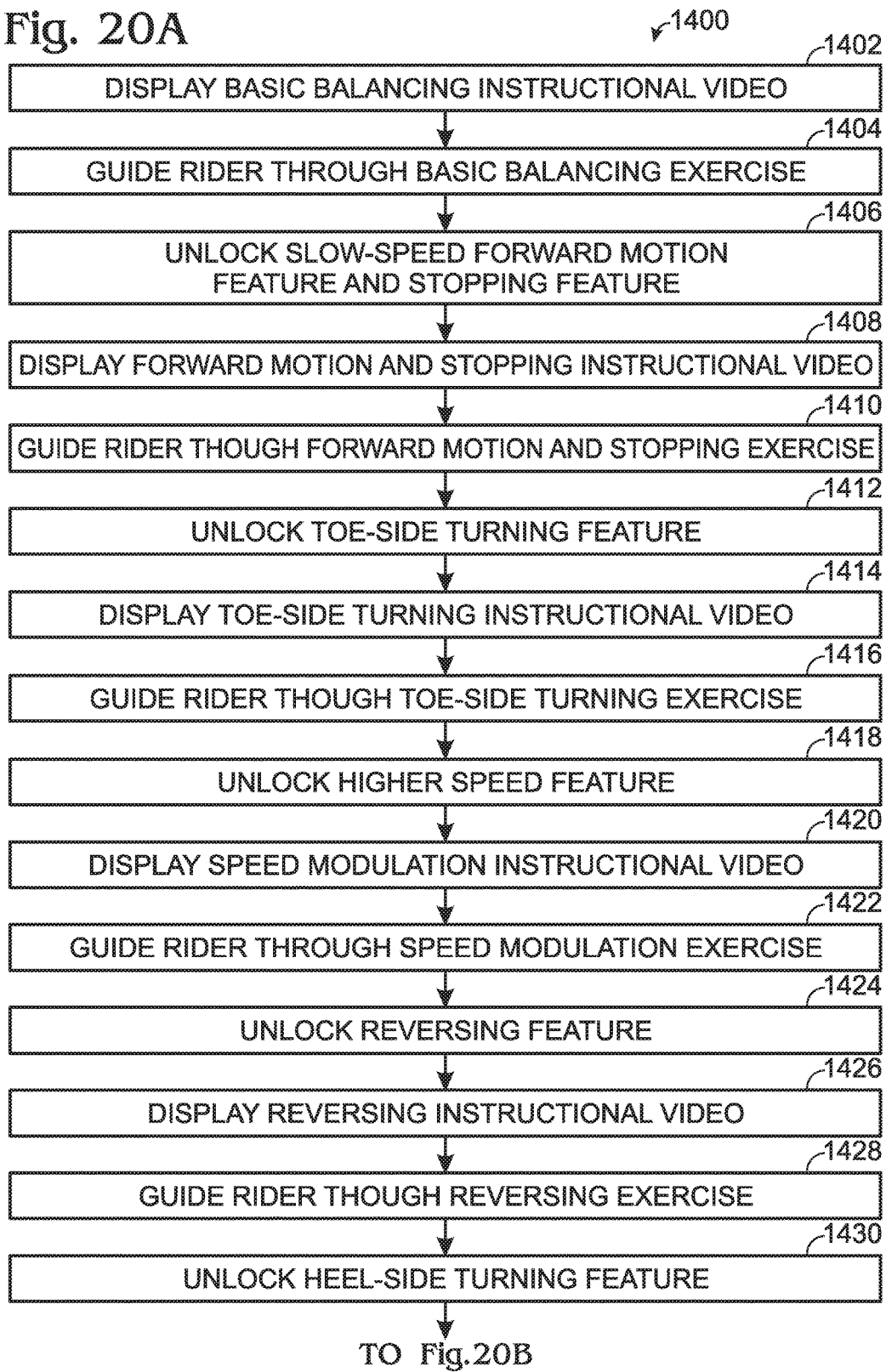

RIDER DETECTION SYSTEM

CROSS-REFERENCES

This application is a continuation of U.S. patent application Ser. No. 14/934,024, filed Nov. 5, 2015, which claims priority from U.S. Provisional Patent Application Ser. No. 62/075,658, filed Nov. 5, 2014, which is hereby incorporated by reference for all purposes. The following related applications and materials are also incorporated herein, in their entireties, for all purposes: U.S. Pat. No. 9,101,817.

FIELD

The present disclosure is generally directed to self-stabilizing electric vehicles. More specifically, the disclosure is directed to rider detection systems and methods for such vehicles.

SUMMARY

The present disclosure provides systems and methods for determining and/or assessing rider presence on an electric vehicle, such as a self-balancing skateboard.

In some embodiments, an electric vehicle may include a board including first and second deck portions each configured to receive a left or right foot of a rider oriented generally perpendicular to a longitudinal axis of the board; a wheel assembly including a ground-contacting element disposed between and extending above the first and second deck portions; a motor assembly mounted to the board and configured to rotate the ground-contacting element around an axle to propel the electric vehicle; at least one orientation sensor configured to measure orientation information of the board; a first sensing region disposed in the first deck portion, the first sensing region including a first pressure-sensing transducer; and a motor controller configured to receive board orientation information measured by the orientation sensor and rider presence information based on an output of the first pressure-sensing transducer, and to cause the motor assembly to propel the electric vehicle based on the board orientation information and the rider presence information.

In some embodiments, an electric skateboard may include a foot deck having first and second deck portions each configured to support a rider's foot oriented generally perpendicular to a longitudinal axis of the foot deck; exactly one ground-contacting wheel disposed between and extending above the first and second deck portions and configured to rotate about an axle to propel the skateboard; at least one orientation sensor configured to measure an orientation of the foot deck; a pressure-sensing transducer disposed on the first deck portion; and an electric motor configured to cause rotation of the wheel based on the orientation of the foot deck and an output of the pressure-sensing transducer.

In some embodiments, a self-balancing electric vehicle may include a frame defining a plane and having a longitudinal axis; a first deck portion mounted to the frame and configured to support a first foot of a rider oriented generally perpendicular to the longitudinal axis of the frame; a second deck portion mounted to the frame and configured to support a second foot of a rider oriented generally perpendicular to the longitudinal axis of the frame; a wheel mounted to the frame between the deck portions, extending above and below the plane and configured to rotate about an axis lying in the plane; at least one orientation sensor mounted to the frame and configured to sense orientation information of the frame; a pressure-sensing transducer disposed on the first deck portion and configured to sense rider presence information based on a force applied to the first deck portion; a motor controller configured to receive the orientation information and the rider presence information and to generate a motor control signal in response; and a motor configured to receive the motor control signal from the motor controller and to rotate the wheel in response, thereby propelling the skateboard.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 2 is an exploded perspective view of the wheel assembly including a hub motor.

FIG. 16 is another exemplary screenshot of the software application, showing a navigation feature.

FIG. 18 is a semi-schematic screenshot of the software application, showing a rotating image.

FIG. 19 is an illustration of operations performed by one embodiment of the software application.

FIGS. 20A and 20B when viewed together are another illustration of operations performed by one embodiment of the software application.

DETAILED DESCRIPTION

An electric vehicle having a rider detection system is described below and illustrated in the associated drawings. Unless otherwise specified, the electric vehicle and/or its various components may, but are not required to, contain at least one of the structures, components, functionalities, and/or variations described, illustrated, and/or incorporated herein. Furthermore, the structures, components, functionalities, and/or variations described, illustrated, and/or incorporated herein in connection with a system or method may, but are not required to, be included in other similar systems or methods. The following description of various embodiments is merely exemplary in nature and is in no way intended to limit the invention, its application or uses.

Overview

An electric vehicle, generally indicated at 100, and components and functionalities in conjunction thereof are shown in FIGS. 1-29. Vehicle 100 may be a self-stabilizing and/or self-balancing vehicle, such as an electrically-powered single-wheel self-balancing skateboard. Vehicle 100 may have a rider stance and/or motion similar to a surfboard or snowboard, which may make vehicle 100 intuitive to ride and provide for increased safety.

Figure 1:
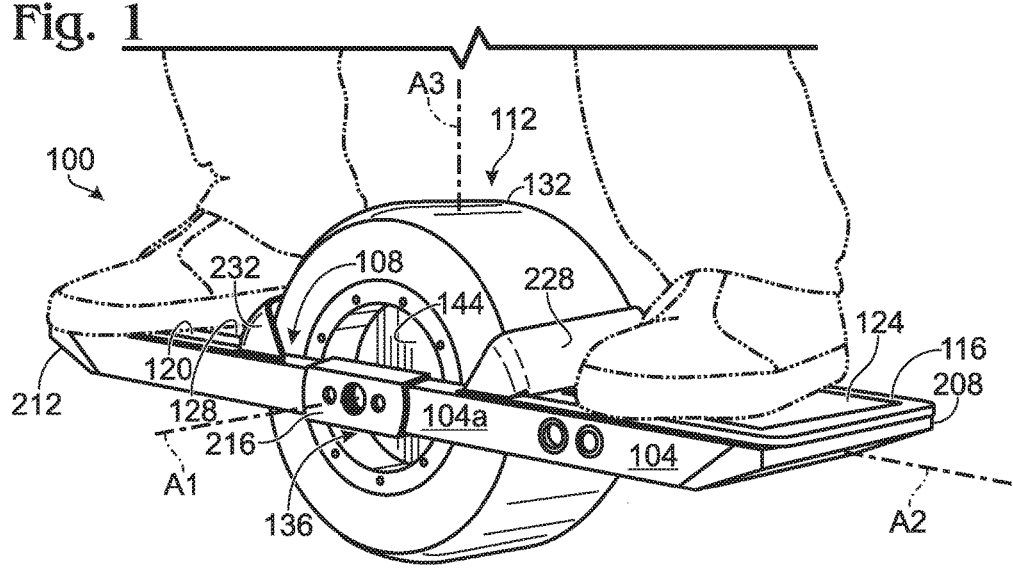
FIG. 1 is a perspective view of a rider on an electric vehicle including a wheel assembly and pitch, roll, and yaw axes.

As shown in FIG. 1, vehicle 100 may include a board (or foot deck, or frame, or platform) 104 having an opening 108 for receiving a wheel assembly 112 between first and second deck portions (or footpads) 116, 120. First and second deck portions 116, 120 may be of the same physical piece, or may be separate pieces. First and second deck portions 116, 120 may be included in board 104. First and second deck portions 116, 120 may each be configured to support a rider's foot. First and second deck portions 116, 120 may each be configured to receive a left or a right foot of the rider.

Frame 104 may define a plane. First deck portion 116 may be mounted to frame 104 and configured to support a first foot of the rider. Second deck portion 120 may be mounted to frame 104 and configured to support a second foot of the rider.

Wheel assembly 112 may be disposed between first and second deck portions 116, 120. First and second deck portions 116, 120 may be located on opposite sides of wheel assembly 112 with board 104 being dimensioned to approximate a skateboard. In other embodiments, the board may approximate a longboard skateboard, snowboard, surfboard, or may be otherwise desirably dimensioned. Deck portions 116, 120 of board 104 may be covered with non-slip material portions 124, 128 (e.g., "grip tape") to aid in rider control.

Wheel assembly 112 may include a ground-contacting element (e.g., a tire, wheel, or continuous track) 132. As shown, vehicle 100 includes exactly one ground-contacting element 132, and the exactly one ground-contacting element is disposed between first and second deck portions 116, 120. Ground-contacting element 132 may be mounted to a motor assembly 136. Motor assembly 136 may be mounted to board 104. Motor assembly 136 may include an axle 140 (see FIG. 2), which may be coupled to board 104 by one or more axle mounts and one or more fasteners, such as a plurality of bolts (see FIGS. 2 and 4). Motor assembly 136 may be configured to rotate ground-contacting element 132 around (or about) axle 140 to propel vehicle 100. For example, motor assembly 136 may include a motor, such as a hub motor 144, configured to rotate ground-contacting element 132 about axle 140 to propel vehicle 100 along the ground. The motor may be an electric motor.

Vehicle 100 may have a pitch axis A1, a roll axis A2, and a yaw axis A3. Pitch axis A1 may be an axis about which tire 132 is rotated by motor assembly 136. For example, pitch axis A1 may pass through axle 140 (e.g., pitch axis A1 may be parallel to and aligned with an elongate direction of axle 140). Roll axis A2 may be perpendicular to pitch axis A1, and may substantially extend in a direction in which vehicle 100 may be propelled by motor assembly 136. For example, roll axis A2 may extend in an elongate direction of board 104. Yaw axis A3 may be perpendicular to pitch axis A1 and to roll axis A2. For example, yaw axis A3 may be normal to a plane defined by deck portions 116, 120.

Wheel 132 may be mounted to frame 104 between deck portions 116, 120. Wheel 132 may extend above and below the plane defined by frame 104. Wheel 132 may be configured to rotate about an axis (e.g., pitch axis A1) lying in the plane. In addition, roll axis A2 may lie in the plane defined by frame 104. In some embodiments, the pitch and roll axes may define the plane.

Tire 132 may be wide enough in a heel-toe direction (e.g., in a direction parallel to pitch axis A1), so that the rider can balance themselves in the heel-toe direction using their own balance. Tire 132 may be tubeless, or may be used with an inner tube. Tire 132 may be a non-pneumatic tire. For example, tire 132 may be "airless", solid, and/or made of foam. Tire 132 may have a profile such that the rider can lean vehicle 100 over an edge of tire 132 (and/or pivot the board about roll axis A2 and/or yaw axis A3—see FIGS. 11 and 12) through heel and/or toe pressure to 'corner' vehicle 100.

Hub motor 144 may be mounted within tire (or wheel) 132 and may be internally geared or may be direct-drive. The use of a hub motor may eliminate chains and belts, and may enable a form factor that considerably improves maneuverability, weight distribution, and aesthetics. Mounting tire 132 onto hub motor 144 may be accomplished by either a split-rim design that may use hub adapters, which may be bolted on to hub motor 144, or by casting a housing of the hub motor such that it provides mounting flanges for a tire bead directly on the housing of the hub motor.

FIG. 2 shows an embodiment of wheel assembly 112 with bolt-on hub adapters 148, 152. One or more fasteners, such as a plurality of bolts 156 may connect a first side of hub motor 144 to hub adapter 148. Hub motor 144 and hub adapter 148 may be positioned in an opening 158 of tire 132 with an outer mounting flange 148a of adapter 148 positioned adjacent a tire bead on a first side (not shown) of opening 158. One or more fasteners, such as a plurality of bolts 160 may connect hub adapter 152 to a second side of hub motor 144, and position an outer mounting flange 152a of adapter 152 adjacent a tire bead 162 on a second side of opening 158. Mounting flanges 148a, 152a may engage the respective tire beads to seal an interior of time 132 for subsequent inflation. Mounting flanges 148a, 152a may frictionally engage tire 132 to transmit rotation of hub motor 144 to tire 132.

Axle 140 may be inserted through a central aperture of a first axle mount 164. An enlarged head portion 140a of axle 140 may be retained by axle mount 164. For example, the central aperture of mount 164 may have a narrowed portion with a diameter that is less than a diameter of portion 140a. A threaded portion 140b of axle 140 may be serially extended through a sleeve 168, a central aperture (not shown) of hub adapter 148, a central aperture 172 of hub motor 144, a central aperture of hub adapter 152, a central aperture 176 of a torque bar 180, and a central aperture of a second axle mount 184. After threaded portion 140b has been extended through the central aperture of mount 184, a nut 186 may be tightened onto threaded portion 140b to secure together wheel assembly 112. For example, the central aperture of mount 184 may have a narrowed portion with a diameter that is less than a diameter of nut 186.

A non-circular member 190 may be fixedly attached to a stator (see FIG. 3) of hub motor 144. When wheel assembly 112 is secured together, member 190 may be seated in a slot 180a of torque bar 180, and torque bar 180 may be seated in a slot 184a of mount 184. Slot 184a may be similarly shaped and/or dimensioned as a slot 164a of mount 164. Member 190 may frictionally engage mount 184 to prevent rotation of the stator during operation of hub motor 144.

Sleeve 168 may be dimensioned to provide desirable spacing of wheel assembly components between mounts 164, 184. For example, a first end of sleeve 168 may be seated in or adjacent the central aperture of mount 164, a second end of sleeve 168 may be seated adjacent a side (not shown) of aperture 172 proximal hub adapter 148, and sleeve 168 may have a length between its first and second ends that provides the desired spacing.

Preferably, hub motor 144 is a direct-drive transverse flux brushless motor. The use of a transverse flux motor may enable high (substantially) instantaneous and continuous torques to improve performance of the electric vehicle.

Figure 3:
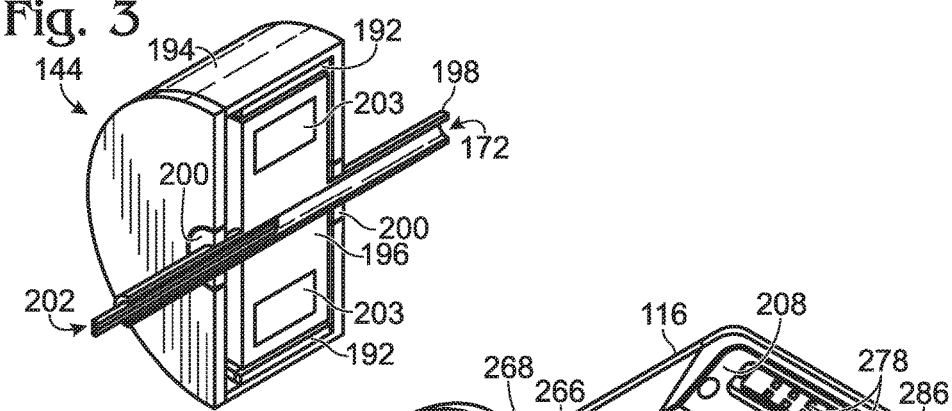
FIG. 3 is a semi-schematic cross-sectional view of the hub motor taken along the pitch axis.

FIG. 3 depicts a schematic example of a direct-drive transverse flux brushless embodiment of hub motor 144 sectioned at the pitch axis. As shown, hub motor 144 may include magnets 192 mounted on (or fixedly secured to) an inside surface of an outer wall of a rotor 194. Rotor 194 may be fixedly attached to hub adapters 148, 152 (see FIG. 2). A stator 196 may be fixedly attached to a sleeve 198 through which central aperture 172 (see FIG. 2) extends. Sleeve 198 may extend through rotor 194. Sleeve 198 may be fixedly attached to member 190 (see FIG. 2). Sleeve 198 may ride on bearings 200 attached to rotor 194. In some embodiments, bearings 200 may be attached to sleeve 198 and may ride on rotor 194. Phase wires 202 may extend through aperture 172 (or other suitable opening) and may electrically connect one or more electric coils 203 of stator 196 with one or more other electrical components (see FIGS. 4 and 5) of vehicle 100, such as a power stage. The one or more electrical components may drive hub motor 144 based on rider inputs to propel and actively balance vehicle 100 (see FIGS. 7-12). For example, the one or more electrical components may be configured to sense movement of board 104 about the pitch axis, and drive hub motor 144 to rotate tire 132 in a similar direction about the pitch axis. Additionally, the one or more electrical components may be configured to sense movement of board 104 about the roll axis and/or the yaw axis, and modulate a rate at which the motor is driven based on this sensed movement, which may increase a performance of vehicle 100, particularly when cornering.

For example, the one or more electrical components may be configured to selectively energize the electric coils, based on rider inputs (e.g., movement of board 104), to produce an electromagnetic field for exerting forces on magnets 192 to cause the desired rotation of rotor 194 relative to stator 196.

In some embodiments, hub motor 144 may be a brushed hub motor. Alternatively, the electric vehicle may include any apparatus and/or motor suitable for driving the hub of a wheel, such as a chain drive, a belt drive, a gear drive and/or a brushed or brushless motor disposed outside of the wheel hub.

Figure 4:
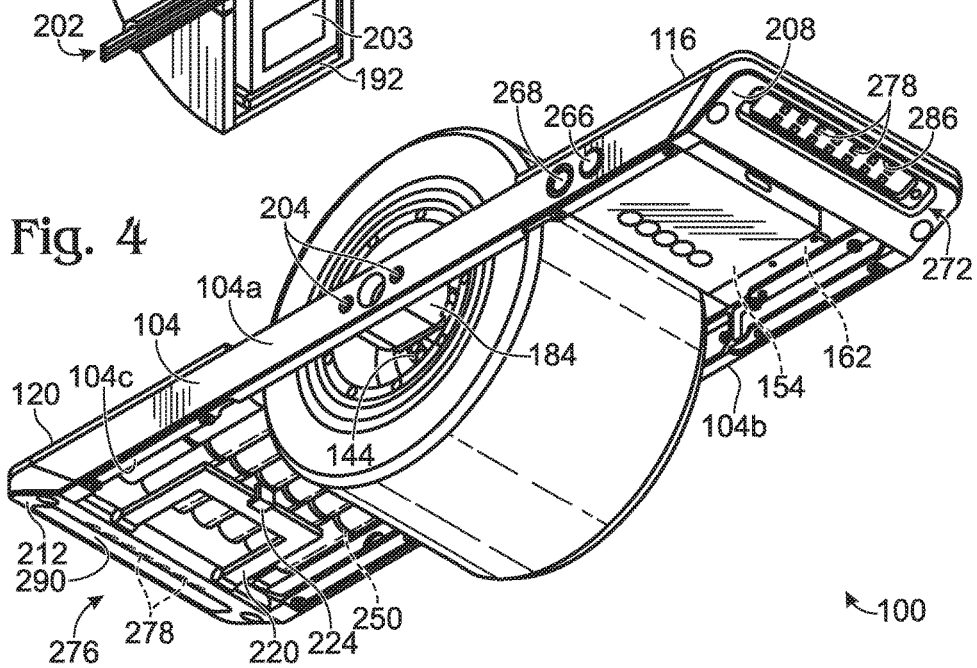
FIG. 4 is a perspective view of a bottom side of the electric vehicle.

Preferably, hub motor 144, tire 132, and axle mounts 164, 184 may be connected together as a subassembly (e.g., wheel assembly 112) and then integrated into the overall vehicle (e.g., operatively installed in board 104) to facilitate tire changes and maintenance. The subassembly may be operatively installed in board 104 by connecting mounts 164, 184 to board 104 with one or more respective fasteners, such as respective bolts 204, 206 (see FIG. 2). FIG. 4 shows bolts 204 connecting mount 184 to a portion of board 104. Bolts 206 may similarly connect mount 164 to an opposite portion of board 104. Axle mounts 164, 184 may be configured to be unbolted from board 104, and the motor may be configured to be 'unplugged' from the one or more electrical components disposed in board 104 to enable the rider to remove the subassembly from board 104, for example, to change the tire or perform other maintenance on wheel assembly 112 and/or on board 104.

Referring to FIGS. 1 and 4, a first skid pad 208 may be integrated into (or connected to) a first end of board 104 proximal first deck portion 116, and a second skid pad 212 may be integrated into (or connected to) a second end of board 104 proximal second deck portion 120. Skid pads 208, 212 may be replaceable and/or selectively removable. For example, the skid pads may include replaceable polymer parts or components. In some embodiments, the skid pads may be configured to allow the rider to bring vehicle 100 to a stop in an angled orientation (e.g., by setting one end of the board against the ground after the rider removes their foot from a rider detection device or switch, which is described below in further detail). The respective skid pad may be worn by abrasion with the surface of the ground as that end of the board is set against (or brought into contact with) the ground.

Vehicle 100 may include one or more side-skid pads configured to protect the paint or other finish on board 104, and/or otherwise protect vehicle 100 if, for example, vehicle 100 is flipped on its side and/or slides along the ground on its side. For example, the one or more side-skid pads may be removably connected to one or more opposing longitudinal sides of the board (e.g., extending substantially parallel to the roll axis). FIG. 1 shows a first side-skid pad 216 connected to a first longitudinal side 104a of board 104. In FIG. 4, side-skid pad 216 has been removed from first longitudinal side 104a. A second side-skid pad (not shown) may be similarly removably connected to a second longitudinal side 104b (see FIG. 4) of board 104 opposite first longitudinal side 104a. The side-skid pads may be incorporated into the electric vehicle as one or more removable parts or components, and/or may be or include replaceable polymer parts or components.

A removable connection of the skid pads and/or the side-skid pads to the board may enable the rider (or other user) to selectively remove one or more of these pads that become worn with abrasion, and/or replace the worn pad(s) with one or more replacement pads.

As shown in FIG. 4, vehicle 100 may include a handle 220. Handle 220 may be disposed on an underside 104c of board 104. Handle 220 may be integrated into a housing or enclosure of one or more of the electrical components.

In some embodiments, handle 220 may be operable between IN and OUT positions. For example, handle 220 may be pivotally connected to board 104, with the IN position corresponding to handle 220 substantially flush with underside 104c of board 104, and the OUT position corresponding to handle 220 pivoted (or folded) away from underside 104 such that handle 220 projects away from deck portion 120.

Vehicle 100 may include any suitable mechanism, device, or structure for releasing handle 220 from the IN position. For example, vehicle 100 may include a locking mechanism 224 that is configured to operate handle 220 between a LOCKED state corresponding to handle 220 being prevented from moving from the IN position to the OUT position, and an UNLOCKED state corresponding to handle 220 being allowed to move from the IN position to the OUT position. In some embodiments, the rider may press locking mechanism 224 to operate the handle from the LOCK state to the UNLOCKED state. The rider may manually move handle 220 from the IN position to the OUT position. The rider may grasp handle 220, lift vehicle 100 off of the ground, and carry vehicle 100 from one location to another.

In some embodiments, handle 220 may include a biasing mechanism, such as a spring, that automatically forces handle 220 to the OUT position when operated to the UNLOCKED state. In some embodiments, locking mechanism 224 may be configured to selectively lock handle 220 in the OUT position.

Vehicle 100 may include any suitable apparatus, device, mechanism, and/or structure for preventing water, dirt, or other road debris from being transferred by the ground-contacting element to the rider. For example, as shown in FIG. 1, vehicle 100 may include first and second partial fender portions 228, 232. Portion 228 is shown coupled to first deck portion 116, and portion 232 is shown coupled to second deck portion 120. Portion 228 may prevent debris from being transferred from tire 132 to a portion of the rider positioned on or adjacent deck portion 116, such as when tire 132 is rotated about pitch axis A1 in a counter-clockwise direction. Portion 232 may prevent debris from being transferred from tire 132 to a portion of the rider positioned on or adjacent deck portion 120, such as when tire 132 is rotated about pitch axis A1 in a clockwise direction.

Figure 7:
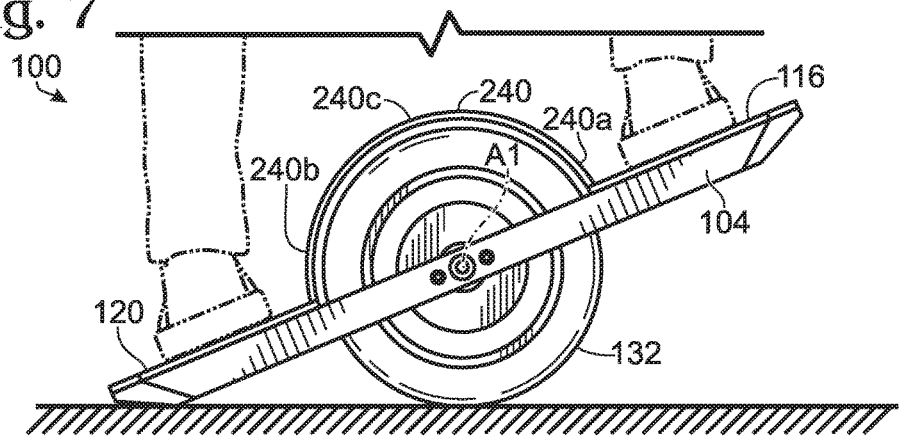
FIG. 7 is a side elevation view of the electric vehicle in a first orientation.

Additionally and/or alternatively, vehicle 100 may include a full fender 240, as shown in FIGS. 7-10. Fender 240 may be configured to prevent a transfer of debris from the ground-contacting element to the rider. For example, a first portion 240a of fender 240 may be coupled to first deck portion 116, a second portion 240b of fender 240 may be coupled to second deck portion 120, and a central portion 240c of fender 240 may connect the first and second portions 240a, 240b of fender 240 above a portion of tire 132 that projects above an upper-side of board 104, as shown in FIG. 7.

Fender 240 and/or fender portions 228, 232 may be attached to at least one of deck portions 116, 120 and configured to prevent water traversed by wheel 132 from splashing onto the rider. Fender 240 may be attached to both of deck portions 116, 120, and may substantially entirely separate wheel 132 from the rider, as is shown in FIGS. 7-10.

Fender 240 may be a resilient fender. For example, fender 240 may include (or be) a sheet of substantially flexible or resilient material, such as plastic. A first side of the resilient material may be coupled to deck portion 116 (or board 104 proximate deck portion 116), and a second side of the resilient material may be coupled to deck portion 120 (or board 104 proximate deck portion 120). A resiliency of the resilient material between the first and second sides may bias fender 240 away from tire 132 to provide adequate spacing between fender 240 and tire 132, as shown in FIGS. 7-10. The adequate spacing may prevent the tire from contacting the fender.

Fender 240 (e.g., portion 240c) may be compressible toward tire 132, if for example, vehicle 100 happens to flip over such that portion 240c is in contact with the ground. When vehicle 100 is restored to a suitable riding position, such as that shown in FIG. 7, the resiliency of the resilient material may restore the fender to a position providing the adequate spacing.

Fender 240 may extend across an overall width of tire 132 in a direction parallel to pitch axis A1, in a manner similar to that of partial fender portion 228 is shown extending in FIG. 1. Similarly, partial fender portion 232 may extend across the overall width of tire 132 in the direction of pitch axis A1.

As indicated in FIG. 4, the one or more electrical components of vehicle 100 may include a power supply 250, a motor controller 254, a rider detection device 262, a power switch 266, and a charge plug 268. Power supply 250 may include one or more batteries which may be re-chargeable, such as one or more lithium batteries that are relatively light in weight and have a relatively high power density. For example, power supply 250 may include one or more lithium iron phosphate batteries, one or more lithium polymer batteries, one or more lithium cobalt batteries, one or more lithium manganese batteries, or a combination thereof. For example, power supply 250 may include sixteen (16) A123 lithium iron phosphate batteries (e.g., size 26650). The batteries of power supply 250 may be arranged in a 16S1P configuration. A microcontroller 269 and/or one or more sensors (or at least one sensor) 270 may be included in or connected to motor controller 254 (see FIG. 5). At least one of sensors 270 may be configured to measure orientation information (or an orientation) of board 104. For example, sensors 270 may be configured to sense movement of board 104 about and/or along the pitch, roll, and/or yaw axes. The motor may be configured to cause rotation of wheel 132 based on the orientation of board 104. In particularly, motor controller 254 may be configured to receive orientation information measured by the at least one sensor of sensors 270 and to cause motor assembly 254 to propel the electric vehicle based on the orientation information. For example, motor controller 254 may be configured to drive hub motor 144 based on received sensed movement of board 104 from sensors 270 via microcontroller 269 to propel and/or actively balance vehicle 100.

One or more of the electrical components may be integrated into board 104. For example, board 104 may include a first environmental enclosure that may house power supply 250, and a second environmental enclosure that may house motor controller 254, and rider detection device 262. The environmental enclosures may protect the one or more electrical components from being damaged, such as by water ingress.

Vehicle 100 may include one or more light assemblies, such as one or more headlight and/or taillight assemblies. For example, a first headlight/taillight assembly (or first light assembly) 272 may be disposed on or at (and/or connected to) a first end portion of board 104 (e.g., at a distal end portion of first deck portion 116), and a second headlight/taillight assembly 276 may be disposed on or at (and/or connected to) a second end portion of board 104 (e.g., at a distal end portion of second deck portion 120). The second end portion of board 104 may be opposite the first end portion.

Headlight/taillight assemblies 272, 276 may be configured to reversibly light vehicle 100. For example, assemblies 272, 276 may indicate the direction that vehicle 100 is moving by changing color. For example, the headlight/taillight assemblies may each include one or more high output red and white LEDs (or other suitable one or more illuminators) 278 configured to receive data from microcontroller 269 (and/or a pitch sensor of sensors 270, such as a 3-axis gyro 280—see FIG. 5) and automatically change color from red to white (or white to red, or a first color to a second color) based on the direction of movement of vehicle 100, with white LEDs (or a first color) shining in the direction of motion and red LEDs (or a second color) shining backward (e.g., opposite the direction of motion). For example, one or more of the headlight/taillight assemblies (e.g., their respective illuminators) may be connected to microcontroller 269 via an LED driver 282 (see FIG. 5), which may be included in or connected to motor controller 254. In some embodiments, the illuminators may include RGB/RGBW LEDs.

Illuminators 278 may be located in and/or protected by skid pads 208, 212, as shown in FIG. 4. For example, skid pads 208, 212 may include respective apertures 286, 290. Illuminators 278 may be disposed in and shine through respective apertures 286, 290. Apertures 286, 290 may be dimensioned to prevent illuminators 278 from contacting the ground. For example, apertures 286, 290 may each have a depth that is greater than a height of illuminators 278. In some embodiments, the illuminators may be separable from the associated skid pad, so that the skid pads may be removed without removing the illuminators.

As shown in FIG. 4, first skid pad 208 and a first illuminator 278 are disposed at a distal end of first deck portion 116, and second skid pad 212 and a second illuminator 278 are disposed at a distal end of second deck portion 120. Each of skid pads may include an aperture (e.g., skid pad 208 may include aperture 286, and skid pad 212 may include aperture 290, as mentioned above) configured to allow light from the corresponding illuminator to shine through while preventing the illuminator from contacting the ground.

Illustrative Electrical System

Figure 5:
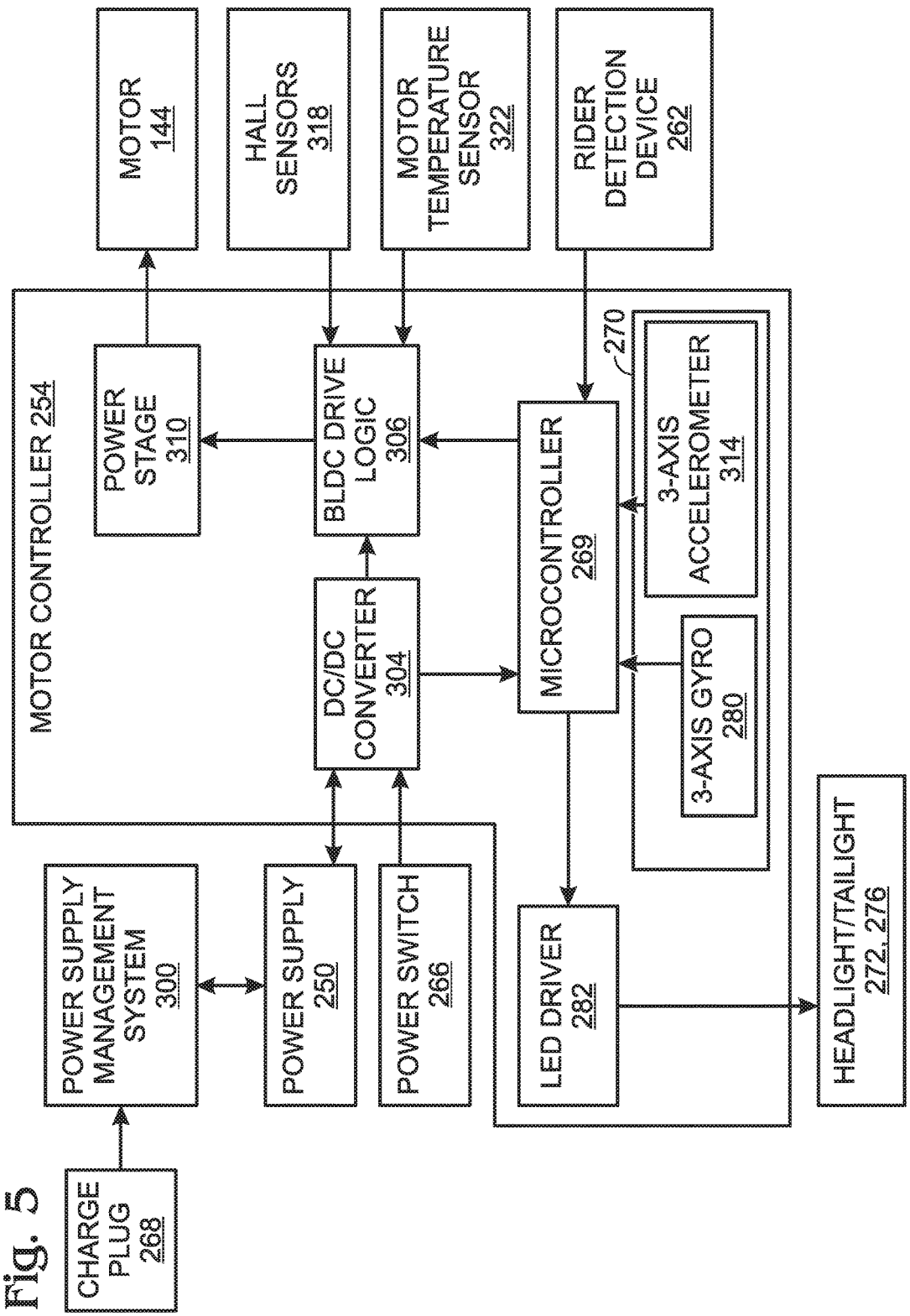
FIG. 5 is a schematic diagram of various electrical components of the electric vehicle.

FIG. 5 shows a block diagram of the one or more electrical components of vehicle 100. The electrical components may include a power supply management system 300, a direct current to direct current (DC/DC) converter 304, a brushless direct current (BLDC) drive logic 306, a power stage 310, a 3-axis accelerometer 314, one or more hall sensors 318, and a motor temperature sensor 322. DC/DC converter 304, BLDC drive logic 306, and power stage 310 may be included in and/or connected to motor controller 254. Accelerometer 314 may be included in sensors 270.

Active balancing (or self-stabilization) of the electric vehicle may be achieved through the use of a feedback control loop or mechanism, which may be implemented in the one or more electrical components. The feedback control mechanism may include sensors 270 connected to (and/or included in) motor controller 254.

Preferably, the feedback control mechanism includes a Proportional-Integral-Derivative (PID) control scheme using one or more gyros (e.g., gyro 280) and one or more accelerometers (e.g., accelerometer 314). Gyro 280 may be configured to measure pivotation of foot deck 104 about the pitch axis. Gyro 280 and accelerometer 314 may be collectively configured to estimate (or measure, or sense) a lean angle of board 104, such as an orientation of the foot deck about the pitch, roll and yaw axes. In some embodiments, the gyro and accelerometer 314 may be collectively configured to sense orientation information sufficient to estimate the lean angle of frame 104 including pivotation about the pitch, roll and yaw axes.

As mentioned above, orientation information of board 104 may be measured (or sensed) by gyro 280 and accelerometer 314. The respective measurements (or sense signals) from gyro 280 and accelerometer 314 may be combined using a complementary or Kalman filter to estimate a lean angle of board 104 (e.g., pivotation of board 104 about the pitch, roll, and/or yaw axes, with pivotation about the pitch axis corresponding to a pitch angle, pivotation about the roll axis corresponding to a roll or heel-toe angle, and pivotation about the yaw axis corresponding to a yaw angle) while filtering out the impacts of bumps, road texture and disturbances due to steering inputs. For example, gyro 280 and accelerometer 314 may be connected to microcontroller 269, which may be configured to correspondingly measure movement of board 104 about and along the pitch, roll, and yaw axes (see FIG. 1). Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. However, additional accelerometer and gyro axes may allow improved performance and functionality, such as detecting if the board has rolled over on its side or if the rider is making a turn.

The feedback control loop may be configured to drive motor 144 to reduce an angle of board 104 with respect to the ground. For example, if in FIG. 1 the rider was to angle board 104 downward, so that first deck portion 116 was 'lower' than second deck portion 120 (e.g., if the rider pivoted board 104 clockwise about pitch axis A1), then the feedback loop may drive motor 144 to cause clockwise rotation of tire 132 about pitch axis A1 (see FIG. 9) and a counter-clockwise force on board 104.

Thus, motion of the electric vehicle may be achieved by the rider leaning their weight toward their 'front' foot. Similarly, deceleration may be achieved by the rider leaning toward their 'back' foot. Regenerative braking can be used to slow the vehicle. Sustained reverse operation may be achieved by the rider maintaining their lean toward their 'back' foot.

As indicated in FIG. 5, microcontroller 269 may be configured to send a signal to BLDC drive logic 306, which may communicate information relating to the orientation and motion of board 104. BLDC drive logic 306 may then interpret the signal and communicate with power stage 310 to drive motor 144 accordingly. Hall sensors 318 may send a signal to the BLDC drive logic to provide feedback regarding a substantially instantaneous rotational rate of the rotor of motor 144. Motor temperature sensor 322 may be configured to measure a temperature of motor 144 and send this measured temperature to logic 306. Logic 306 may limit an amount of power supplied to motor 144 based on the measured temperature of motor 144 to prevent motor 144 from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measure or estimated pitch angle of board 104).

Alternatively or additionally, some embodiments may include neural network control, fuzzy control, genetic algorithm control, linear quadratic regulator control, state-dependent Riccati equation control or other control algorithms. In some embodiments, absolute or relative encoders may be incorporated to provide feedback on motor position.

As mentioned above, during turning, the pitch angle can be modulated by the heel-toe angle (e.g., pivotation of the board about the roll axis—see FIG. 11), which may improve performance and prevent a front inside edge of board 104 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of 'carving' when turning, similar to the feel of carving a snowboard through snow or a surfboard through water.

Figure 8:
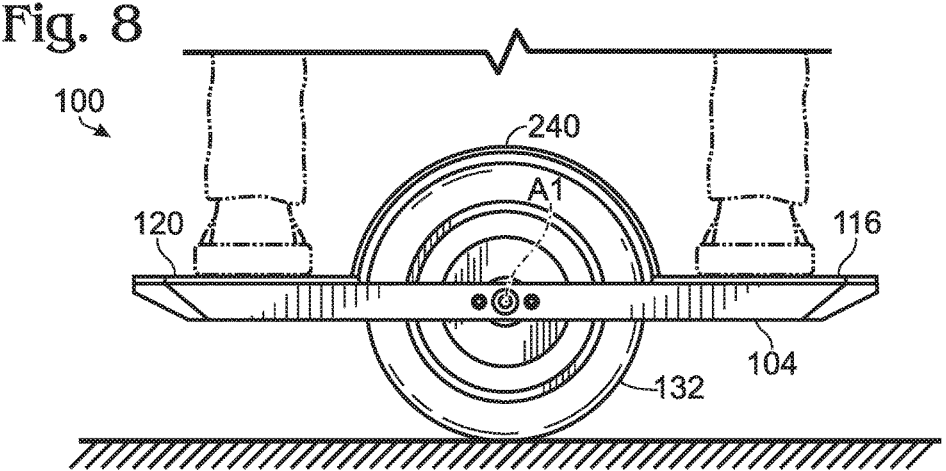
FIG. 8 is a side elevation view of the electric vehicle moved to a second orientation to activate a control loop for the hub motor.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle—as shown in FIG. 8). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

Referring back to FIG. 5, the one or more electrical components may be configured to manage power supply 250. For example, power supply management system 300 may be a battery management system configured to protect batteries of power supply 250 from being overcharged, over-discharged, and/or short-circuited. System 300 may monitor battery health, may monitor a state of charge in power supply 250, and/or may increase the safety of the vehicle. Power supply management system 300 may be connected between charge plug 268 and power supply 250.

The rider (or other user) may couple a charger to plug 268 and re-charge power supply 250 via system 300.

In operation, power switch 266 may be activated (e.g., by the rider). Activation of switch 266 may send a power-on signal to converter 304. In response to the power-on signal, converter 304 may convert direct current from a first voltage level provided by power supply 250 to one or more other voltage levels. The other voltage levels may be different than the first voltage level. Converter 304 may be connected to the other electrical components via one or more electrical connections to provide these electrical components with suitable voltages.

Converter 304 (or other suitable circuitry) may transmit the power-on signal to microcontroller 269. In response to the power-on signal, microcontroller may initialize sensors 270, and rider detection device 262.

The electric vehicle may include one or more safety mechanisms, such as power switch 266 and/or rider detection device 262 to ensure that the rider is on the board before engaging the feedback control loop. In some embodiments, rider detection device 262 may be configured to determine if the rider's feet are disposed on the foot deck, and to send a signal causing motor 144 to enter an active state when the rider's feet are determined to be disposed on foot deck 104.

Rider detection device 262 may include any suitable mechanism, structure, or apparatus for determining whether the rider is on the electric vehicle. For example, device 262 may include one or more mechanical buttons, one or more capacitive sensors, one or more inductive sensors, one or more optical switches, one or more force resistive sensors, and/or one or more strain gauges. The one or more mechanical buttons may be located on or under either or both of first and second deck portions 116, 120 (see FIG. 1). The one of more mechanical buttons may be pressed directly (e.g., if on the deck portions), or indirectly (e.g., if under the deck portions), to sense whether the rider is on board 104. The one or more capacitive sensors and/or the one or more inductive sensors may be located on or near a surface of either or both of the deck portions, and may correspondingly detect whether the rider is on the board via a change in capacitance or a change in inductance. Similarly, the one or more optical switches may be located on or near the surface of either or both of the deck portions. The one or more optical switches may detect whether the rider is on the board based on an optical signal. The one or more strain gauges may be configured to measure board or axle flex imparted by the rider's feet to detect whether the rider is on the board. In some embodiments, device 262 may include a hand-held "dead-man" switch. Various embodiments and aspects relating to device 262 are discussed further below, in the section titled Illustrative Rider Detection Devices, Systems, and Methods.

If device 262 detects that the rider is suitably positioned on the electric vehicle, then device 262 may send a rider-present signal to microcontroller 269. The rider-present signal may be the signal causing motor 144 to enter the active state. In response to the rider-present signal (and/or the board being moved to the level orientation), microcontroller 269 may activate the feedback control loop for driving motor 144. For example, in response to the rider-present signal, microcontroller 269 may send board orientation information (or measurement data) from sensors 270 to logic 306 for powering motor 144 via power stage 310.

In some embodiments, if device 262 detects that the rider is no longer suitably positioned or present on the electric vehicle, device 262 may send a rider-not-present signal to microcontroller 269. In response to the rider-not-present signal, circuitry of vehicle 100 (e.g., microcontroller 269, logic 306, and/or power stage 310) may be configured to reduce a rotational rate of the rotor relative to the stator to bring vehicle 100 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 144 even though the rider may not be present on the vehicle (e.g., temporarily), which may allow the rider to perform various tricks. For example, device 262 may be configured to delay sending the rider-not-present signal to the microcontroller for a predetermined duration of time, and/or the microcontroller may be configured to delay sending the signal to logic 306 to cut power to the motor for a predetermined duration of time.

The electric vehicle may include other safety mechanisms, such as a buzzer mechanism. The buzzer mechanism may be configured to emit an audible signal (or buzz) to the rider if circuitry within the electric vehicle detects an error. For example, the buzzer mechanism may emit an error signal to the rider if circuitry within the electric vehicle does not pass a diagnostic test (see FIG. 6).

Illustrative Operational Method

Figure 6:
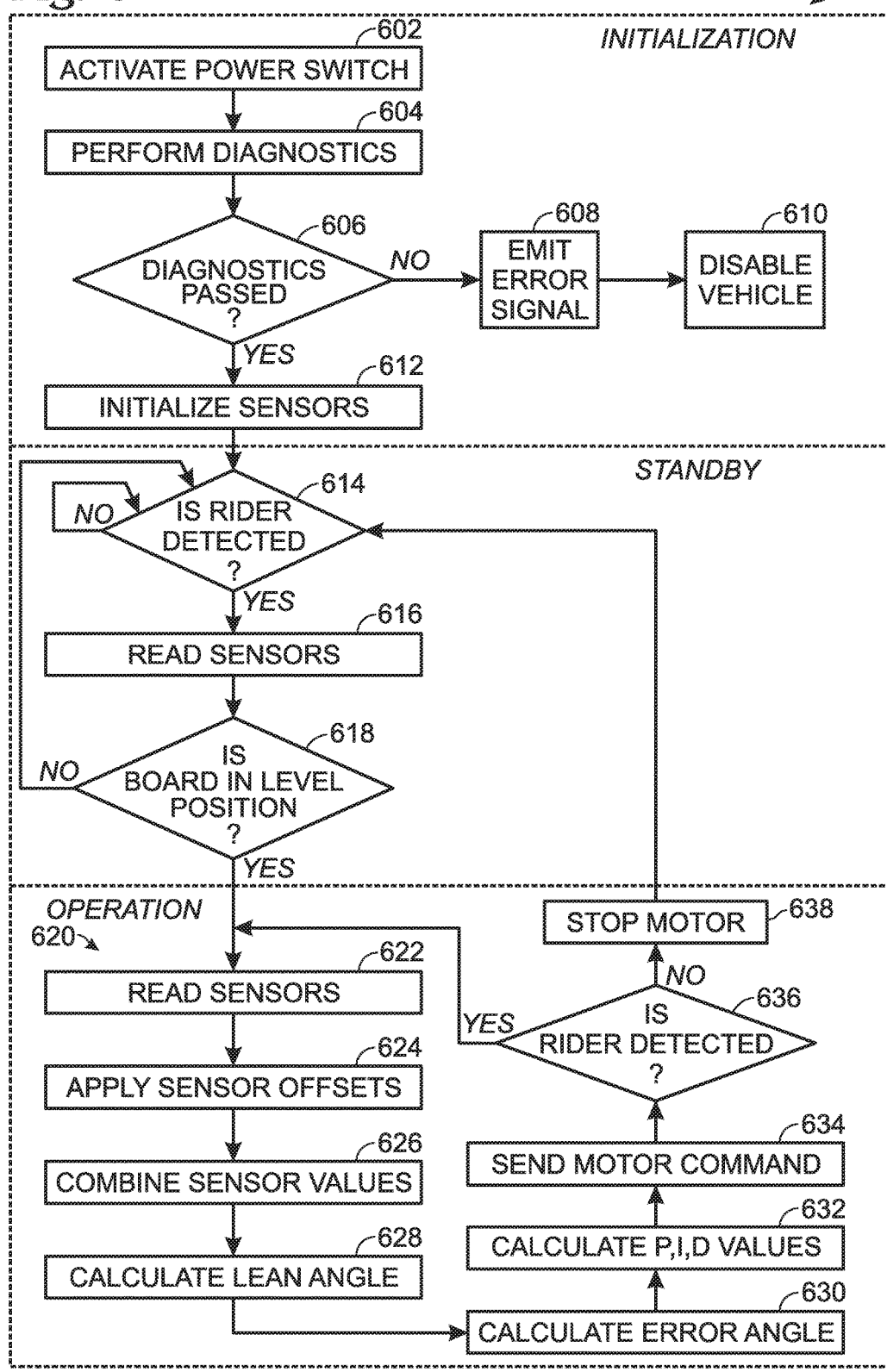
FIG. 6 is a flowchart depicting exemplary initialization, standby, and operation procedures of the electrical components.

FIG. 6 depicts multiple steps of a method (or operations), generally indicated at 600, which may be performed by and/or in conjunction with vehicle 100. Although various steps of method 600 are described below and depicted in FIG. 6, the steps need not necessarily all be performed, and in some cases may be performed in a different order than the order shown.

As shown, method 600 may include an initialization procedure, a standby procedure, and an operation procedure. The initialization procedure may include a step 602 of activating a power switch. For example, at step 602, the rider may press switch 266 (see FIG. 4). The initialization procedure may then flow to a step 604 of performing one or more diagnostics. For example, circuitry of vehicle 100 may perform one or more diagnostic tests to determine whether the one or more electrical components are properly operational. For example, at step 604, motor controller 254 may perform a self-diagnostic to determine whether components thereof, such as the power stage, are operational.

The initialization procedure may include a step 606 of determining whether the diagnostics performed at step 606 were passed. If it is determined at step 606 that the diagnostics were not passed, then method 600 may flow to a step 608 of emitting an error signal, and a step 610 of disabling the vehicle. For example, vehicle 100 may emit an audible buzz via the buzzer mechanism or emit a light signal (e.g., by flashing illuminators 278) if it is determined that the diagnostics were not passed, and may prevent motor controller 254 from powering motor 144. In some embodiments, disabling the vehicle may involve locking the rotor relative to the stator. For example, the motor controller may continuously energize the electric coils of the stator with a substantially constant current to prevent the rotor from rotating relative to the stator. However, if it is determined at step 606 that the diagnostics were passed, then the initialization procedure may flow to a step 612 of initializing sensors 270.

As shown in FIG. 6, the initialization procedure may then flow to the standby procedure. The standby procedure may include a step 614 of determining whether a rider is detected. For example, circuitry of vehicle 100 may determine whether the rider is detected as being suitably positioned on board 104 (e.g., with one foot on first deck portion 116, and the other foot on second deck portion 120, as shown in FIG. 7), based on a received signal from rider detection device 262. If it is determined at step 614 that the rider is not detected on the vehicle, then step 614 may be repeated until a rider is detected. In some embodiments, device 262 may substantially continuously send the rider-present signal to the circuitry when the rider is positioned on the vehicle, and/or may substantially continuously send the rider-not-present signal to the circuitry when the rider is not positioned on the vehicle. In some embodiments, device 262 may intermittently send these signals based on the position of the rider.

If it is determined at step 614 that a rider is detected as suitably positioned on board 104, as is shown in FIG. 7, then the standby procedure may flow to a step 616 of reading or acquiring one or more measurements (e.g., orientation information) from sensors 270 (e.g., gyro 280 and accelerometer 314).

The standby procedure may include a step 618 of determining whether board 104 is in the level orientation (or other predefined and/or predetermined orientation). Circuitry of vehicle 100 may determine whether board 104 is in the level orientation based on the measurements acquired from sensors 270 at step 616. If it is determined at step 618 that board 104 is not in the level orientation, as is shown in FIG. 7, then the standby procedure may return to step 614.

However, if it is determined at step 618 that board 104 is in the level orientation, as is shown in FIG. 8, then the standby procedure may flow to the operation procedure (e.g., to initialize self-balancing of the vehicle) via the feedback control loop, an example of which is generally indicated at 620 in FIG. 6. Loop 620 may be a closed-loop balancing routine, which may be repeated until the rider is no longer detected.

Loop 620 may include a step 622 of reading or acquiring one or more measurements from sensors 270. For example, at step 622, microcontroller 269 (or other circuitry) may acquire acceleration measurements of board 104 along the pitch, roll, and yaw axes from accelerometer 314, and may acquire position measurements of board 104 about the pitch, roll, and yaw axes from gyro 280.

Loop 620 may include a step 624 of applying sensor offsets to one or more of the measurements acquired at step 622. For example, offsets for the accelerometer and the gyro may be determined at step 612 during initialization, which may be applied at step 624 to the measurements acquired at step 622 to substantially correct sensor bias.

Loop 620 may include a step 626 of combining sensor values. For example, at step 626, microcontroller 269 may combine measurements from accelerometer 314 and gyro 280 acquired at step 622 (including or not including the applied offsets) with the complementary or Kalman filter.

Loop 620 may include a step 628 of calculating (or determining) the lean angle of board 104. At step 628, microcontroller 628 may determine the lean angle based on the combined measurements from accelerometer 314 and gyro 280.

Figure 9:
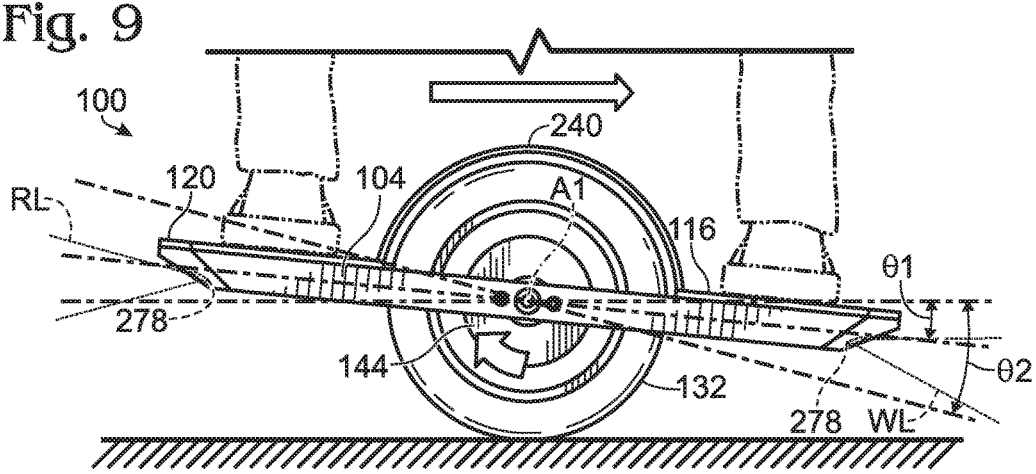
FIG. 9 is a side elevation view of the electric vehicle moved to a third orientation to drive the hub motor in a clockwise direction.

As described above, the lean angle may include the pitch, roll, and yaw angles of board 104. As shown in FIG. 9, the rider may pivot board 104 about pitch axis A1 to produce a pitch angle θ1, in which case at step 630, the microcontroller may determine that board 104 has pitch angle θ1 based on combined measurements (e.g., orientation information) from accelerometer 314 and gyro 280. As shown, the pitch angle may be determined based on an orientation of board 104 with respect to the level orientation. The level orientation may be determined or calculated based on a measured gravity vector.

Loop 620 may include a step 630 of calculating an error angle. The error angle may be an estimate or calculation of a displacement of the board from the level orientation based on orientation information from sensors 270. For example, in the orientation shown in FIG. 9, the microcontroller may determine that pitch angle θ1 is the error angle. At step 630, microcontroller 269 may calculate (or determine) the error angle with respect to a gravity vector measurement acquired from accelerometer 314.

Loop 620 may include a step 632 of calculating P, I, and D values for the PID control scheme. These values may be used to filter out impacts from bumps on the ground, road texture, and/or disturbances due to unintentionally sudden steering inputs.

Loop 620 may include a step 634 of sending a motor command (or motor control signal) to motor 144. At step 634, the motor controller may generate the motor control signal in response to the orientation information received sensors 270. Motor 144 may be configured to receive the motor control signal from motor controller 254 and to rotate wheel 132 in response to the orientation information.

For example, at step 634, microcontroller 269 may send a signal to logic 306 including information corresponding to the calculated lean angle, the calculated error angle (which may be the calculated lean angle or a percentage thereof), and/or the calculated P, I, D values. Based on this information, BLDC drive logic 306 may determine how to accordingly drive motor 144. For example, logic 306 may determine that the rotor of motor 144 should be driven in a clockwise direction (in FIG. 9) at a first rate, based on pitch or error angle θ1, to attempt to move board 104 back to the level orientation, and send a corresponding motor command to power stage 310. Power stage 310 may then accordingly power motor 144 via phase wires 202 (see FIG. 3). If the rider maintains downward pressure on deck portion 116, the clockwise rotation of the rotor of motor 144 may result in rightward propulsion of vehicle 100 in FIG. 9.

As shown in FIG. 9, in response to the motor command, illuminators 278 coupled to deck portion 116 may emit white light WL, and illuminators 278 coupled to deck portion 120 may emit red light RL, as vehicle 100 moves rightward.

Referring back to FIG. 6, loop 620 may include a step 636 of determining whether the rider is detected (e.g., as suitably positioned on board 104). The microcontroller may make this determination based on a signal from the rider detection device, for example, in a manner similar to that of step 614. In some embodiments, the determination of whether the rider is detected may be based on motor torque (e.g., a reduction of motor torque below a predefined threshold), or vehicle orientations that may indicate that the electric vehicle is not under rider control (e.g., excessive pitch, roll, and/or yaw angle or modulation thereof).

At step 636, if it is determined that the rider is not detected (e.g., has fallen, jumped, or otherwise dismounted the electric vehicle), then the operation procedure may flow to a step 638 of stopping motor 144, and return to step 614. At step 638, stopping the motor may involve locking the rotor relative to the stator, such that the ground-contacting element (e.g., the tire) stops rotating around the pitch axis relative to the board. For example, at step 638, the motor controller may energize the electric coils of the stator with a substantially continuous, constant, and/or relatively strong electric current to produce a substantially constant and/or strong electromagnetic field for stopping rotation of the magnets of the rotor around the pitch axis relative to the stator.

However, if it is determined at step 363 that the rider is detected (e.g., is still suitably positioned on the electric vehicle), then loop 620 may return to step 622, and loop 620 may be repeated. For example, in a subsequent repetition of loop 620, the rider may have moved board 104 to an orientation having a pitch angle θ2 (see FIG. 9). Pitch angle θ2 may correspond to further pivotation of board 104 about pitch axis A1 relative to the orientation of board 104 shown in FIG. 9, such that deck portion 116 has been moved further below the level orientation, and deck portion 120 has been moved further above the level orientation. In this subsequent repetition of loop 620, circuitry of vehicle 100 may power the rotor in a clockwise direction at a second rate, based on pitch angle θ2, to attempt to move board 104 back to the level orientation. The second rate may be greater than the first rate.

Figure 10:
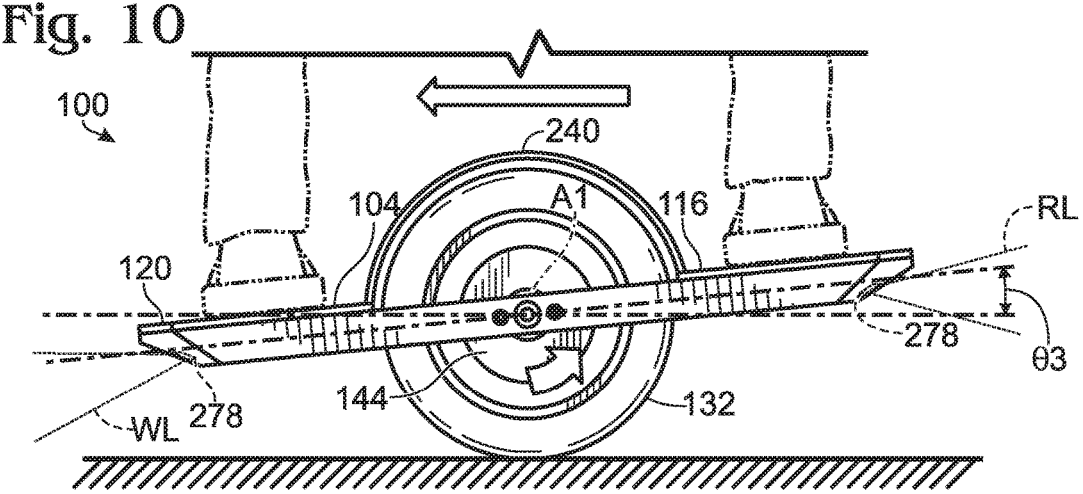
FIG. 10 is a side elevation view of the electric vehicle moved to a fourth orientation to drive the hub motor in a counter-clockwise direction.

In another subsequent repetition of loop 620, the rider may have moved board 104 to an orientation having a pitch angle θ3 (see FIG. 10). As shown, pitch angle θ3 corresponds to pivotation of board 104 about pitch axis A1, such that deck portion 120 has been moved below the level orientation, and deck portion 116 has been moved above the level orientation. In this subsequent repetition of loop 620, circuitry of vehicle 100 may power the rotor of motor 144 to rotate in a counter-clockwise direction (as indicated in FIG. 10) at a third rate, based on pitch angle θ3, to attempt to move board 104 back to the level orientation. If the rider maintains downward pressure on deck portion 120, the counter-clockwise rotation of the rotor of motor 144 may result in leftward propulsion of vehicle 100 in FIG. 10. An absolute value of the third rate may correspond to a greater rate than an absolute value of the first rate, as angle θ3 in FIG. 10 is shown to have a larger magnitude than angle θ1 in FIG. 9. Similarly, an absolute value of the third rate may correspond to a lesser rate than an absolute value of the second rate, as angle θ3 is shown to have a smaller magnitude than angle θ2 in FIG. 9.

As mentioned above, the light assemblies may switch color when vehicle 100 reverses direction. For example, as shown in FIG. 10, in response to the reversed direction of movement of vehicle 100 (relative to the direction of movement shown in FIG. 9), illuminators 278 coupled to deck portion 116 may switch from illuminating white light to emitting red light RL, and illuminators 278 coupled to deck portion 120 may switch from emitting red light to emitting white light RL, as vehicle 100 moves leftward.

In particular, illuminators 278 of the first light assembly (e.g., disposed at the first end portion of board 104 on the right-hand side of FIG. 9) may be configured to output light of a first color (e.g., white) when board 104 is being propelled generally in a first direction (e.g., indicated in FIG. 9 as to the right), and to output light of a second color (e.g., red) when board 104 is being propelled generally in a second direction (e.g., to the left in FIG. 10).

Similarly, illuminators 278 of the second light assembly (e.g., disposed at the second end portion of board 104 on the left-hand side of FIG. 9) may be configured to output light of the second color (e.g., red) when board 104 is being propelled generally in the first direction (e.g., indicated in FIG. 9 as to the right), and to output light of the first color (e.g., white) when board 104 is being propelled generally in the second direction (e.g., to the left in FIG. 10).

Figure 11:
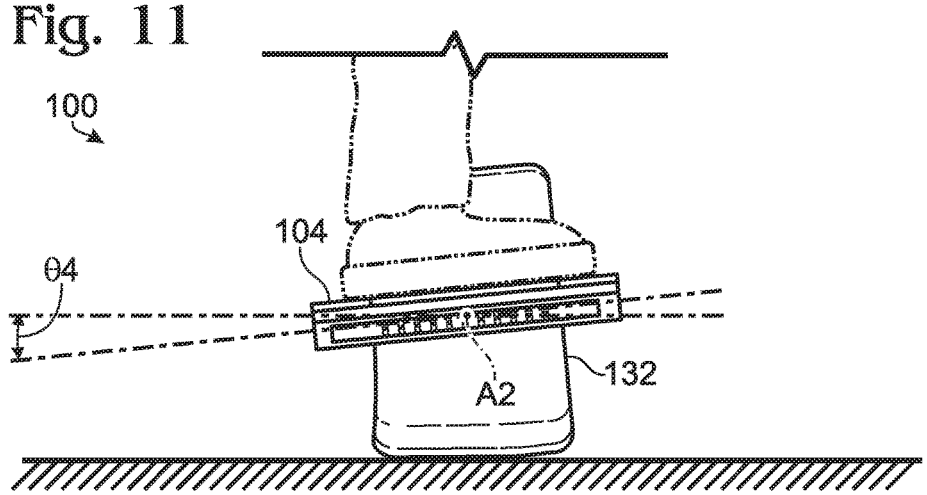
FIG. 11 is a semi-schematic front elevation view of the electric vehicle moved to a fifth orientation to modulate a rotational rate of the hub motor.

Vehicle 100 may include a turn compensation feature. The turn compensation feature may adjust a rate at which motor 144 is driven based on the roll angle of board 104. For example, the rider may pivot board 104 from the level orientation to a rolled orientation about roll axis A2, as shown in FIG. 11, by changing heel and/or toe pressure applied to board 104, resulting in a roll angle θ4, in which case, step 628 of FIG. 6 may involve calculating roll angle θ4 based on orientation information from sensors 270. If board 104 is also pivoted about the pitch axis (e.g. has pitch angle θ1 or θ3, as shown respectively in FIGS. 9 and 10), then at step 634 of FIG. 6, the circuitry may send an increased amount of power to motor 144 based on roll angle θ4 to increase the rotational rate of the rotor and thus tire 132. A magnitude of the increased amount of power may be based on a magnitude of the roll angle, with a greater roll angle magnitude corresponding to a greater increase in power, and a lesser roll angle magnitude corresponding to a lesser increase in power.

Similarly, the turn compensation feature may adjust a rate at which motor 144 is driven based on a change in the yaw angle of board 104. For example, the rider may pivot board 104 from a first orientation (as shown in dash double dot lines in FIG. 12) to a second orientation (as shown in solid lines in FIG. 12) about yaw axis A3, resulting in a yaw angle change θ5. If in this second orientation, board 104 is also oriented to have a pitch angle, then at step 634 of FIG. 6, the circuitry may send an increased amount of power to motor 144 based on yaw angle change 85 to increase the rotational rate of the rotor and thus tire 132.

FIGS. 7-12 show a process of operating vehicle 100. FIG. 7 shows the rider on board 104 in a starting orientation. The starting orientation may correspond to one of the rider's feet pressing downward on deck portion 120 to brace deck portion 120 against the ground, and the other of the rider's feet positioned on deck portion 116. As shown, the rider's right foot is pressing downward on deck portion 120, and the rider's left foot is contacting deck portion 116. However, board 104 may be configured to allow the rider to operate vehicle 100 in a "switch" stance, with their left foot on deck portion 120, and their right foot on deck portion 116. In (or prior to) the starting position, the rider may power-on vehicle 100 by pressing switch 266 (see FIG. 4). In the starting position, circuitry of vehicle 100 may prevent or hinder rotation of the rotor relative to the stator (see FIG. 3), for example, by powering the electric coils with a relatively strong and substantially continuously constant current (and/or mechanically locking and/or creating increased friction between the rotor and the stator), which may assist the rider in moving board 104 to the level orientation. The circuitry of vehicle 100 may be configured to remove this rotational hindrance when orientation information from the sensors indicates that board 104 has been moved to the level orientation.

The rider may move board 104 to the level orientation, as shown in FIG. 8, by shifting their weight to pivot board 104 about pitch axis A1. Movement of board 104 to the level orientation may initialize active balancing of vehicle 100 via control loop 620 (see FIG. 6). In some embodiments, circuitry of vehicle 100 may be configured to initialize (or proceed to) loop 620 after board 104 has been maintained in the level orientation (or a range of orientations near the level orientation) for a predetermined duration of time (e.g., 1 second), which may provide adequate delay for ensuring that the rider is in control of vehicle 100.

As indicated in FIG. 9, the rider may pivot board 104 about pitch axis A1 by angle θ1 to move vehicle 100 "forward" (that is to the to the right in FIG. 9) via clockwise rotation provided by motor 144. The rider may increase the clockwise rotation of motor 144, and thus the forward speed of vehicle 100 by further pivoting board 104 in a clockwise direction, for example to produce pitch angle θ2.

As the rider increases the speed of vehicle 100 by pressing deck portion 116 further toward the ground (e.g., to pitch angle θ2), the power output of motor 144 may approach a maximum power output. At the maximum output of motor 144, pressing deck portion 116 further toward the ground may result in a front end of the board contacting the ground at a relatively high speed, which may result in an accident. To prevent a likelihood of such an accident, vehicle 100 may include a power margin indication feature configured to indicate to the rider a margin between a current power output of motor 144 and the maximum power output of motor 144. For example, when the current power output of motor 144 reaches a predetermined headroom threshold near the maximum power output (e.g., if motor 144 is being driven at a relatively high speed or rate and the rider pivots board 104 to pitch angle θ2), circuitry of vehicle 100 may be configured to send an increased pulse of power (e.g., in excess of the headroom threshold, but less than or equal to the maximum power output) to motor 144 to push back the rider and move the board 104 back toward (and/or to) the level orientation (or in some embodiments, even further back). In some embodiments, the power margin indicator may communicate a relationship between the current power output and the maximum power output by emitting an audio signal (e.g., from the buzzer) or a visual signal (e.g., from a tachometer). In some embodiments, the power margin indicator may be configured to similarly indicate a margin (or ratio) between the current power output and the maximum power output when vehicle 100 is propelled in reverse, as shown in FIG. 10.

While pivoting board 104 to have a pitch angle with respect to the level orientation, as shown in FIGS. 9 and 10, the rider may pivot board 104 about roll axis A2, as is shown in FIG. 11, to modulate power to the motor.

Figure 12:
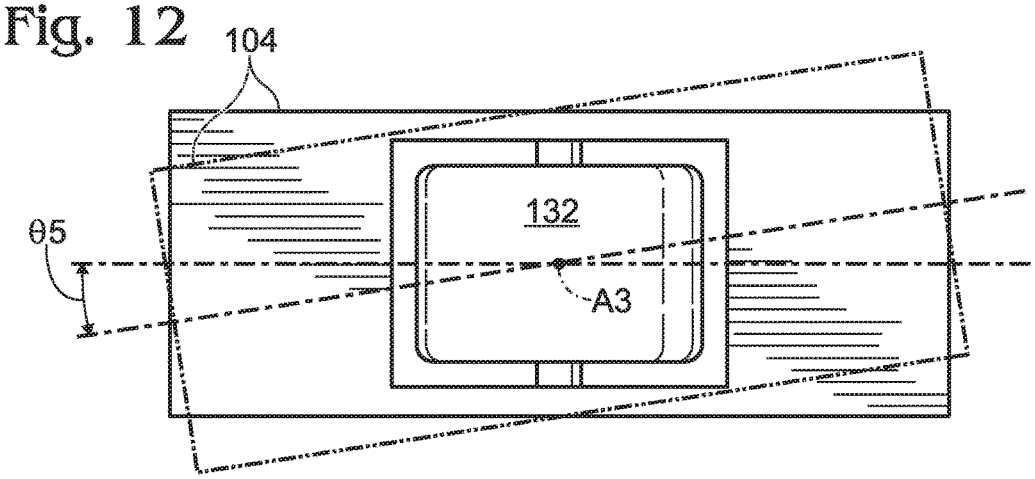
FIG. 12 is semi-schematic top view of the electric vehicle being moved to a sixth orientation to modulate the rotational rate of the hub motor.

Similarly, while pivoting board 104 to have a pitch angle with respect to the level orientation, the rider may pivot board 104 about yaw axis A3, as is shown in FIG. 12, to modulate power to the motor.

Illustrative Peripheral Systems and Software

In some embodiments, one or more electric vehicles, which may each be similar to and/or include vehicle 100, may be monitored, altered, and/or controlled by one or more peripheral devices. Examples of such systems and components thereof are shown in FIGS. 13-22.

Figure 13:
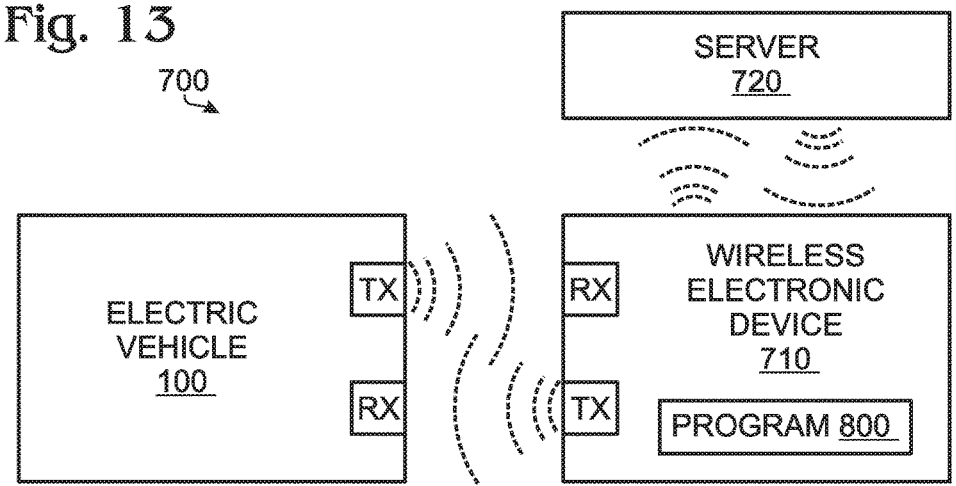
FIG. 13 is a schematic diagram of a system including the electric vehicle in communication with a wireless electronic device.

FIG. 13 shows an illustrative system, generally indicated at 700. System 700 may include vehicle 100 in communication with a wireless electronic device 710. Device 710 may be any suitable wireless electronic device including a transmitter TX and/or a receiver RX. For example, device 710 may be a smartphone, a tablet computer, or any other wireless electronic device capable of wirelessly transmitting and/or receiving data.

Device 710 may be configured to wirelessly upgrade and/or alter firmware of vehicle 100 (e.g., of microcontroller 269). For example, device 710 may download an encrypted firmware package from a server 720 over a network, such as a cloud network. Device 710 may transmit the package from a transmitter TX of device 710 to a receiver RX of vehicle 100. In some embodiments, vehicle 100 may include a transmitter TX for transmitting data regarding the operational status of vehicle 100 to a receiver RX of device 710. Reception of the data by device 710 may prompt device 710 to download the package from server 720.

Device 710 may include a processor (or processor unit—see FIG. 23), a storage device (see FIG. 23), and a program (or software application) 800 comprising a plurality of instructions stored in the storage device. The plurality of instructions may be executed by the processor to receive data transmitted from vehicle 100, display the received data from vehicle 100 on a graphical user interface (GUI) of device 710, display a component configuration of vehicle 100 on the GUI of device 710, transmit data to vehicle 100, reconfigure (or alter) one or more components of vehicle 100, control one or more components of vehicle 100, and/or perform one or more of the features depicted in FIGS. 14-20.

Figure 14:
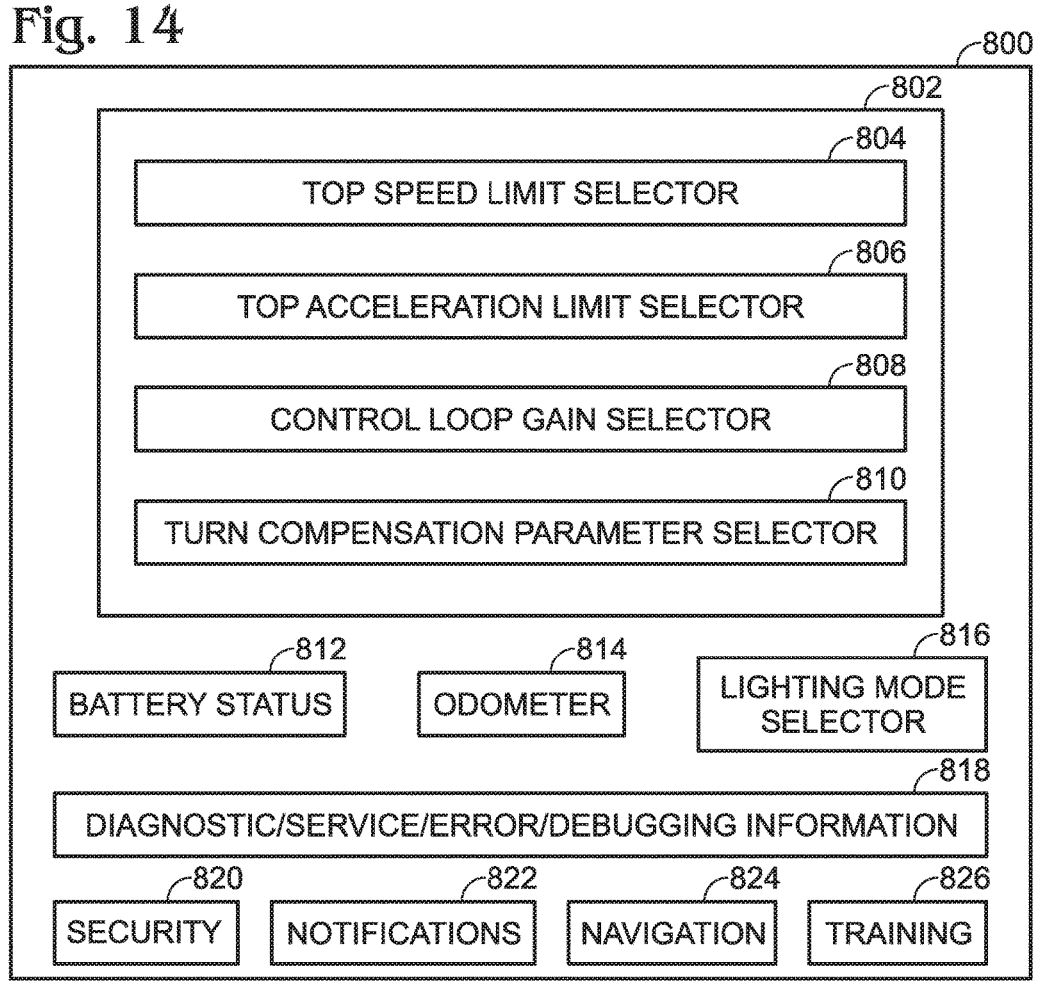
FIG. 14 is a schematic diagram of a software application for the wireless electronic device.

FIG. 14 depicts a schematic block diagram of various features which may be included in application 800. Application 800 may include a riding mode selector feature 802. Feature 802 may be configured to allow the rider (or other user) to select and/or change a riding mode of vehicle 100. For example, feature 802 may include a top speed limit selector 804, a top acceleration limit selector 806, a control loop gain selector 808, and/or a turn compensation parameter selector 810. Selector 804 may allow a top speed limit of vehicle 100 (e.g., of the rotor relative to the stator) to be selected (and/or set). For example, the rider may be a novice, in which case selector 804 may be used to set the top speed limit to a relatively low speed, such as 2 miles per hour (MPH). At a later time and/or as the rider becomes more proficient in operating the electric vehicle, the rider may use selector 804 to increase the top speed limit (e.g., to 8 MPH). In another example, the electric vehicle may be used by multiple users, at least one of which may be a novice, and at least one of which may be more experienced. Selector 804 may be used to set the top speed limit to a lower speed for the novice, and to a higher speed for the more experienced rider. Similarly, selector 806 may be used to select a top acceleration limit of the electric vehicle (e.g., of the rotor relative to the stator).

Selector 808 may be configured to allow a gain of the control loop of the electric vehicle (e.g., see feedback control loop 620 in FIG. 6) to be decreased, increased, or otherwise modulated. For example, the gain may determine a rate at which the rotational rate of the rotor of motor 144 is changed based on how much the lean angle (e.g., pitch angle) of board 104 has been changed. By using selector 808 to set the gain to a lower level, a first change in the pitch angle may correspond to a smaller acceleration of the electric vehicle. By using selector to set the gain to a higher level, the first change in the pitch angle may correspond to a larger acceleration of the electric vehicle. Setting the gain may include changing one or more gains of the PID control loop, such as a proportional gain (Kp), an integral gain (Ki), and/or a derivative gain (Kd). However, changing the proportional gain may more dramatically change a riding feel of the vehicle, as compared to changing the integral gain and/or the derivative gain.

Selector 810 may be configured to allow one or more turn compensation parameters to be selected and/or set. For example, selector 810 may allow the user to select whether the roll angle is used to modulate the motor command, and/or set a gain corresponding to a relationship between the roll angle and modulation of the motor command. Similarly, selector 810 may allow the user to select whether a yaw angle change is used to modulate the motor command, and/or set a gain corresponding to a relationship between the yaw angle change and modulation of the motor command.

Application 800 may include a battery status feature 812. Feature 812 may display on the GUI, or otherwise communicate to the user, an amount of available power remaining in the power supply (e.g., the one or more batteries) of the electric vehicle. For example, feature 812 may display remaining battery power as a percentage, and/or a distance corresponding to how far the remaining power may propel the electric vehicle. If the electric vehicle is plugged into a recharging device for recharging the power supply, then feature 812 may display (or communicate) a duration of time until the power supply is fully recharged.

Application 800 may include an odometer feature 814. Feature 814 may display (or otherwise communicate) a total distance that the electric vehicle has been ridden or operated. For example, circuitry of the electric vehicle may transmit data representative of a total number of revolutions of the tire of the electric vehicle to the wireless electronic device. The wireless electronic device may then display (or update) the distance communicated by feature 814 based on the transmitted data.

Application 800 may include a lighting mode selector 816. The electric vehicle may include a plurality of lighting modes, such as a first, second, third, fourth, and fifth lighting modes. The first lighting mode may be configured to reversibly light the headlight/taillight assemblies (e.g., switch the color of the illuminators of the assemblies based on the direction of movement of the electric vehicle). The second lighting mode may be configured to not reversibly light the headlight/taillight assemblies (e.g., not switch the colors based on the direction of movement). The third lighting mode may be configured to emit brighter light from the headlight/taillight assemblies (e.g., for night time riding). The fourth lighting mode may be configured to emit dimmer light from the headlight/taillight assemblies (e.g., for daytime riding). The fifth lighting mode may be configured to flash the illuminators of one or both of the headlight/taillight assemblies (e.g., to increase visibility of the electric vehicle).

Selector 816 may allow selection of one or more modes of the plurality of lighting modes. For example, the rider may use selector 816 to select the first lighting mode and the third lighting mode, resulting in the headlight/taillight assemblies being reversibly lit and emitting a greater amount of light. The rider may subsequently use selector 816 to deselect the third lighting mode, and select the fourth lighting mode to decrease power consumption of the electric vehicle. In some embodiments selector 816 may be used to switch the headlight/taillight assemblies between ON and OFF modes.

Application 800 may include an informational feature 818. Feature 818 may be configured to acquire diagnostic, service, error, and/or debugging information from the electric vehicle, and display (or otherwise communicate) this information to the user. For example, feature 818 may acquire and/or display information (or data) representative of, indicative of, corresponding to, and/or associated with battery voltage, current amps, total amp-hours, regenerated or regen amp-hours (e.g., an amount of electric energy recovered through regenerative braking), a current lean angle of the board, a safety margin (e.g., representative of the current power output of the motor relative to the maximum power output of the motor, such as the current power output represented as a percentage of the maximum power output), a current motor temperature, a history of motor temperatures, total battery cycles, and/or an indication of an operational status of any of the foregoing.

Application 800 may include a security feature 820. Feature 820 may be configured to prevent unauthorized use of the electric vehicle. For example, feature 820 may be configured to toggle the electric vehicle between an enabled mode and a disabled mode. The enabled mode may allow the motor of the electric vehicle to be powered. The disabled mode may prevent the motor of the electric vehicle from being powered (and/or electrically and/or mechanically lock the rotor relative to the stator).

In some embodiments, an owner and/or an authorized rider of a particular electric vehicle (or set of electric vehicles) may be issued a personal identification number (PIN) corresponding that particular electric vehicle (or set of electric vehicles), in which case feature 820 may allow the owner and/or the authorized rider to input the PIN to toggle the electric vehicle between the enabled and disabled modes. In some embodiments, a predefined relatively close proximity of a wireless electronic device with an authorized PIN to a corresponding electric vehicle may toggle the electric vehicle to the enable mode. In some embodiments, removal of the wireless electronic device with the authorized PIN from the predefined relatively close proximity may toggle the electric vehicle to the disable mode.

Feature 820 may allow the predefined relatively close proximity to be adjusted. For example, feature 820 may allow the authorized user to switch the proximity between a relatively short distance (e.g., 5 meters) and a relatively long distance (e.g., 50 meters). Setting the proximity to the short distance may be suitable for personal use. Setting the proximity to the long distance may be suitable for situations in which the electric vehicle is being used by another party, such a renter or a friend. In some embodiments, feature 820 may toggle the electric vehicle to the disable mode when a measured distance between the wireless electronic device and the electronic vehicle is indicative of the wireless electronic device not being carried by a rider of the electronic vehicle. Proximity of the wireless electronic device (or distance there between) may be measured or estimated by any suitable apparatus, mechanism, device, or system, such as a global positioning system (GPS) or one or more other suitable proximity sensors.

Application 800 may include a notification feature 822. Feature 822 may receive a notification from the electric vehicle that the electric vehicle has been turned on (or powered-up). Feature 822 may receive a notification from the electric vehicle when power in the power supply reaches a predefined level, such as at or below 20%. Feature 822 may display (or otherwise communicate) one or more of these notifications to the user.

Application 800 may include a navigation feature 824. Feature 824 may display a map of routes taken by the electric vehicle. The map may include vehicle statistics, such as average speed for one or more of the routes, a top speed for one or more of the routes, a top cornering speed for one or more of the routes, and/or a top acceleration for one or more of the routes. The routes may be identified based at least in part on GPS tracking of either the vehicle or the wireless electronic device, or tracking via another suitable system. The vehicle statistics may be determined based at least in part on motor controller information transmitted from the vehicle to the wireless electronic device.

Feature 824 may allow the user to share the map, one or more particular routes, and/or data corresponding thereto with one or more other parties via one or more social networks, such as FACEBOOK® or TWITTER®. Feature 824 may display a map of a user's current location, and overlay on the map of a circle (or other shape) indicative of how far the electric vehicle can travel (e.g., vehicle range) given a current power level in of the power supply. The map may show locations of nearby charging stations. The charging stations may include public electric vehicle charging stations and/or locations of individual electric vehicle enthusiasts who have been previously identified as allowing others to plug into electrical outlets at their respective homes or businesses.

Application 800 may include a training feature 826. Feature 826 may be configured to guide a rider through a learning progression regarding various features of the electric vehicle. The learning progression may include a series of instructional videos. Each of the instructional videos may be related to a different feature of the electric vehicle. Each video may be followed by one or more guided exercises. If the rider successfully completes the one or more guided exercises, then feature 826 may unlock a new feature of the electric vehicle. The new feature may be a feature that was previously unavailable to the rider.

Figure 15:
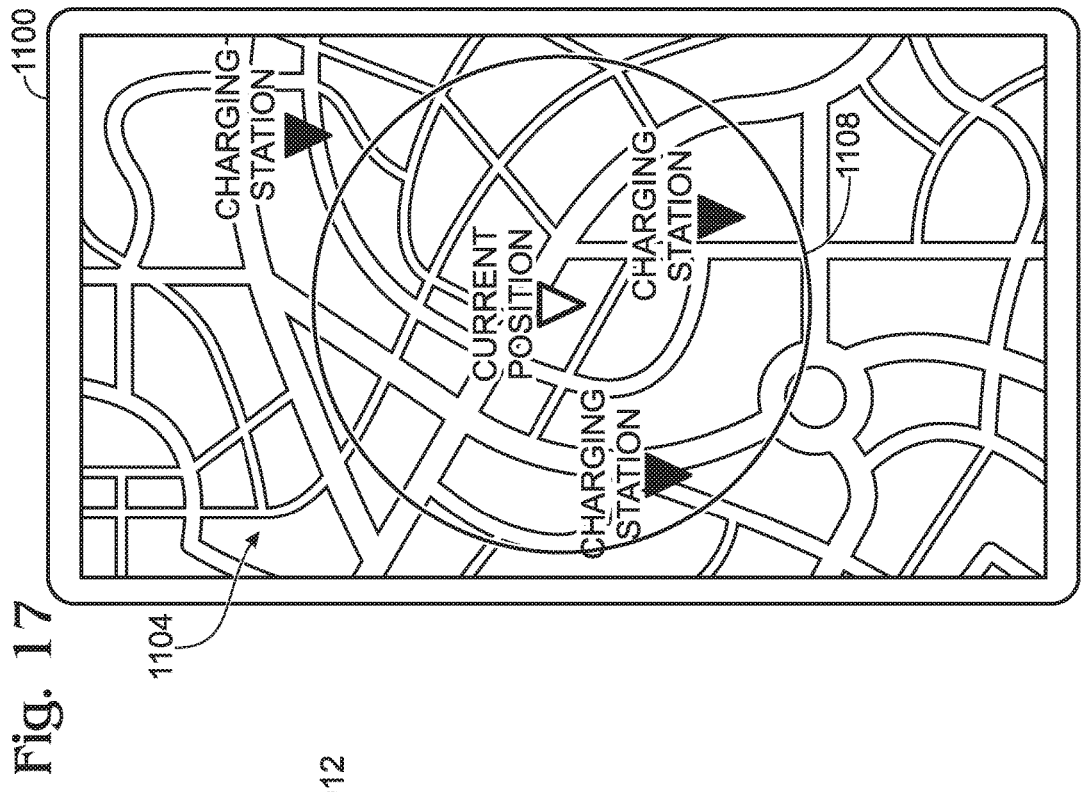
FIG. 15 is an exemplary screenshot of the software application.

FIG. 15 shows an exemplary screenshot of a home screen 900 of the software application. As shown, screen 900 may include a field 902. Field 902 may show a percentage of battery power remaining (in this example 88%), and may depict this percentage in a bar graph. Screen 900 may include a field 904 displaying an estimated vehicle range (in this case 5.3 miles) that the electric vehicle may travel based on the percentage of battery power remaining. Fields 902 and/or 904 may be an example of feature 812.

Screen 900 may include a riding mode selector field 906. Field 906 may be an example of feature 802. Field 906 may allow the user to select one of a plurality of riding modes, such as a learn mode, a speed mode, or a trick mode. The learn mode may be suitable for use by a novice rider when learning how to operate the electric vehicle. For example, the learn mode may correspond to a lower top speed limit, a lower top acceleration limit, and/or relatively low (or no) turn compensation. The speed (or commute) mode may be suitable for riders who desire to quickly travel on the electric vehicle from one place to another. For example, the speed mode may correspond to a higher top speed limit, a higher top acceleration limit, and/or moderate turn compensation. The trick mode may be suitable for riders who desire to perform various tricks on the electric vehicle. For example, the trick mode may correspond to a moderate top speed limit, a higher top acceleration limit, and/or higher turn compensation.

The user may select the learn mode by tapping on a learn field 908, the user may select the speed mode by tapping on the speed field 910, and the user may select the trick mode by tapping on a trick field 912. Selection of one of the modes may correspond to a de-selection of one or more of the other modes.

Selection of a riding mode may result in display of a field 914. Field 914 may show one or more operational parameters of the selected riding mode. For example, if the speed mode is selected, as shown in FIG. 15, then field 914 may show a top speed field 916, an acceleration field 918, a corning field 920, and a range field 922. Field 916 may depict a top speed limit for the speed mode and/or enable the user to set the top speed limit for the speed mode. Field 918 may depict a top acceleration limit for the speed mode and/or enable the user to set the top acceleration limit for the speed mode. Field 920 may depict and/or enable the user to set a rate at which modulation of the roll angle and/or the yaw angle is factored into modulation of the rotational rate of the rotor about the pitch axis. Field 922 may depict how one or more operational parameters (or settings) of the speed mode may affect a range that the electric vehicle can travel. For example, if the operational parameters consume a greater amount of energy, then field 922 may indicate a shorter range, as shown. Similarly, field 914 may depict and/or enable one or more similar operational parameters to be set for the learn and trick modes.

Screen 900 may include a lighting mode field 924. Field 924 may be an example of feature 816. Field 924 may enable the user to toggle the headlight/taillight assemblies between two or more lighting modes, such as an OFF mode and an ON mode. The OFF mode may correspond to the illuminators of the headlight/taillight assemblies not emitting light. The ON mode may correspond to the illuminators of the headlight/taillight assemblies emitting light.

Screen 900 may include an indicator 926. Indicator 926 may indicate how or through what protocol device 710 is connected to vehicle 100 (see FIG. 13). As indicated in FIG. 15, device 710 may be connected to (e.g., in communication with) vehicle 100 via Bluetooth protocol. However, in other embodiments, the wireless electronic device may connect to the electric vehicle via another protocol suitable for transmitting data, preferably wirelessly, from one circuit to another.

Screen 900 (and other screens of application 800) may include one or more icons that allow a user to switch between various features of application 800. For example, the screens of application 800 may include icons 928, 930, 932, 934. Icon 928 may be a riding-mode/home screen icon, which when tapped (or otherwise selected) by the user may switch application 800 to screen 900. Icon 930 may be a navigation icon, which when selected by the user may switch application 800 to one or more navigation screens. For example, selection of icon 930 may result in display of a menu that allows the user to choose either of screens 1000 or 1100 (see FIGS. 16 and 17). Icon 932 may be a configuration icon, which when selected by the user may display features 818 and/or 820 (see FIG. 14) on a screen 1200 (see FIG. 18). Icon 934 may be a training icon, which when selected by the user may switch application 800 to one or more training screens. The one or more training screens may progress through one or more operations, examples of which are shown in FIGS. 19 and 20.

In FIG. 16, screen 1000 depicts an example of navigation feature 824 (see FIG. 14). As shown in FIG. 16, screen 1000 may display a map, generally indicated at 1004. Map 1004 may show one or more routes traveled by vehicle 100, such as a first route 1008 (shown in dash double dot lines), a second route 1012 (shown in dash dot lines), and a third route 1016 (shown in dashed lined). For one or more of the routes, map 1004 may display one or more statistics for the electric vehicle along the respective route. For example, map 1004 may display an average speed statistic (e.g., 6 MPH) for the electric vehicle along route 1008, a location at which the electric vehicle achieved a top (or maximum) cornering speed, a location at which the electric vehicle achieved a top acceleration, and a location at which the electric vehicle achieved a top speed. Values of the top cornering speed, acceleration, and speed may be displayed on map 1004 (e.g., proximal the associated locations). Similarly, map 1004 may display statistics for routes 1012, 1016. In some embodiments, map 1004 may simultaneously display statistics for all of the routes shown. In some embodiments, map 1004 may display statistics for only a subset of the routes, which may be selected by the user. In some embodiments, map 1004 may allow selective display and/or sharing of specific routes (e.g., by tapping on a specific route to access display and/or sharing controls for that specific route).

Figure 17:
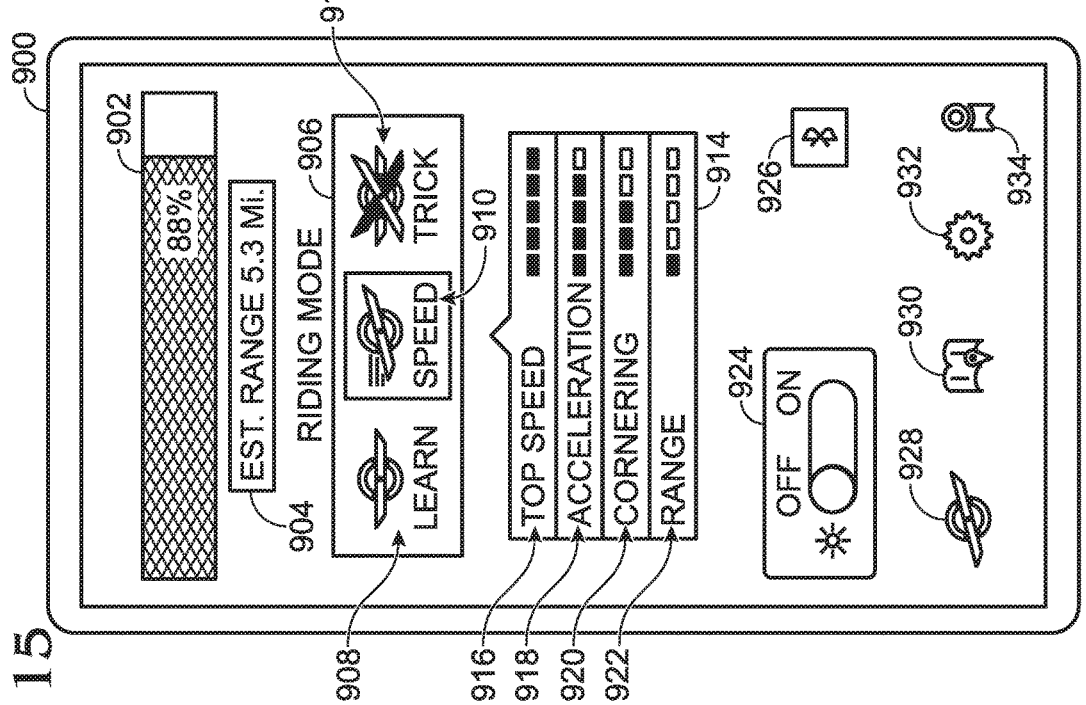
FIG. 17 is another exemplary screenshot of the software application, showing another navigation feature.

In FIG. 17, screen 1100 depicts another example of navigation feature 824 (see FIG. 14). As shown in FIG. 17, screen 1100 may display a map, generally indicated at 1104. Map 1104 may show a current position of the electric vehicle. Feature 824 may overlay a circle 1108 (or other shape, outline, or perimeter) on map 1104 to indicate how far the electric vehicle can travel (e.g., a range of the electric vehicle) based on a current power level in the power supply of the electric vehicle. Map 1104 may depict locations (and/or proximities) of one or more charging stations. For example, map 1104 shows two charging stations located within circle 1108, and one charging station located outside of circle 1108. Display of the current position of the electric vehicle, the locations of the charging stations, and/or circle 1108 may help the user to determine a direction of travel, and/or whether to visit a particular charging station to re-charge the power supply of the electric vehicle. For example, based on map 1104, the user may decide to travel to one of the charging stations located within circle 1108.

In some embodiments, map 1104 of FIG. 17 may include map 1004 of FIG. 16. For example, map 1104 may include a display of routes taken by the electric vehicle and statistics for those routes.

FIG. 18 is a schematic of screen 1200 including features 818, 820. Screen 1200 (and/or other screens of the application) may include an image 1204, which may rotate based on the lean angle (e.g., pivot, roll, and/or yaw angles) of the electric vehicle. For example, rotation of image 1204 may be based on sensor information (or orientation information) from the electric vehicle gyro and accelerometer. For example, the software application may receive a signal indicative of sensor information corresponding to the electric vehicle moving from the orientation shown in FIG. 7 to the orientation shown in FIG. 8. In response to this signal, the software application may correspondingly rotate a display of image 1204 from a first position (shown in solid lines) to a second position (shown in dashed double dot lines). The software application may similarly rotate image 1204 to indicate movement about the roll axis and/or the yaw axis. As shown in FIG. 18, image 1204 is an image of the electric vehicle. However, in other embodiments, the image may be an image of another object or shape, or an image of a texture.

Rotation of image 1204 may enable the user to remotely view movement of the electric vehicle, and/or conveniently visualize an accuracy of sensor information. For example, rotation of image 1204 may enable the user to verify and/or otherwise interpret information provided by feature 818. As described above, feature 818 may display diagnostic, service, error, and/or debugging information to the user. For example, the user may manually tilt the electric vehicle, and visually verify that circuitry in the electric vehicle is accurately calculating the lean angle by visually comparing a tilt of image 1204 to the actual electric vehicle.

Rotation of image 1204 may increase a security of the electric vehicle. For example, rotation of image 1204 may indicate that an unauthorized party is moving the electric vehicle, in which case the user may access feature 820 to toggle the electric vehicle from the enable mode to the disable mode to prevent unauthorized use of the electric vehicle.

In some embodiments image 1204 may be a background image of the software application. For example, image 1204 may be displayed "behind" either of features 818, 820. In some embodiments, image 1204 may appear on one or more of the screens of the software application when the software application receives a signal indicating that the electric vehicle has been powered on, which may increase the security of the electric vehicle. In some embodiments, image 1204 may disappear from one or more of the screens of the software application when the software application receives a signal indicating that the electric vehicle has been powered off.

First Illustrative Method for Instructing a User

FIG. 19 depicts multiple steps of a method, generally indicated at 1300, which may be performed by the software application, such as by training feature 826 (see FIG. 14). Although various steps of method 1300 are described below and depicted in FIG. 19, the steps need not necessarily all be performed, and in some cases may be performed in a different order than the order shown.

Method 1300 may include a step 1302 of providing a first set of instructions to the user. The first set of instructions may relate to a first product feature of the electric vehicle, such as basic balancing. The first set of instructions may include text, audio, and/or video instructions provided by the software application on the wireless electronic device to the user. For example, providing the first set of instructions may involve displaying an instructional video to the user to educate the user in how to execute a first process related to basic balancing, such as pivoting the board from a starting position (see FIG. 7) with one end of the board on the ground, to the level orientation (see FIG. 8) to activate the feedback control loop.

Method 1300 may include a step 1304 of guiding the user through a first exercise related to the first product feature. For example, at step 1304, the software application may (through text, audio, and/or video) direct the user to execute the first process. For example, at step 1304 the software application may be configured to emit voice instructions through a speaker in the wireless electronic device. The voice instructions may direct the user to position the board in the starting position, place their feet on the first and second footpads, and/or move the board to the level orientation.

Method 1300 may include a step 1306 of determining whether the first exercise was successfully performed (or completed). At step 1306 a signal may be sent from the electric vehicle to the wireless electronic device. The signal may include information from which the software application may determine whether the first exercise was successfully performed, such as sensor information and/or other information from the microcontroller of the electric vehicle. Based on the signal, the software application may determine whether the first exercise was successfully performed.

At step 1306, if it is determined that the first exercise was not successfully performed (e.g., that the board was not moved to the level orientation), then method 1300 may return to step 1302 and the first set of instructions and/or a set of instructions similar to the first set may be provided to the user on the wireless electronic device by the software application.

However, if it is determined at step 1306 that the first exercise was successfully performed, then method 1300 may proceed to a step 1308 of unlocking a second product feature of the electric vehicle. The second product feature may be a feature of the electric vehicle that was previously disabled. The second product feature may be generally more difficult to operate than the first product feature, and/or a product feature that is more complex and/or builds upon a function of the first product feature. For example, the second product feature may be a sustained forward motion feature that involves maintaining a pitch angle of the board to propel the board forward, as is shown in FIG. 9.

As shown in FIG. 19, method 1300 may include a step 1310 of providing a second set of instructions to the user. The second set of instructions may relate to the second product feature. For example, at step 1310, the software application may provide an instructional video on the wireless electronic device that shows the user how to hold the front foot pad down to drive the electric vehicle forward, and how to allow the board to return to the level orientation to bring the electric vehicle to a stop.

Similar to respective steps 1304, 1306, method 1300 may include a step 1312 of guiding the user through a second exercise related to the second product feature, and a step 1314 of determining whether the second exercise was successfully performed. At step 1314, if it is determined that the second exercise was not successfully performed, then method 1300 may return to step 1310. However, if it is determined at step 1314 that the second exercise was successfully performed, then method 1300 may proceed to a step 1316 of unlocking a third product feature. The third product feature may be more complex than the first and second product features, and/or may require operational knowledge of the first and/or second product features in order to be safely performed.

Second Illustrative Method for Instructing a User

Figure 20B:
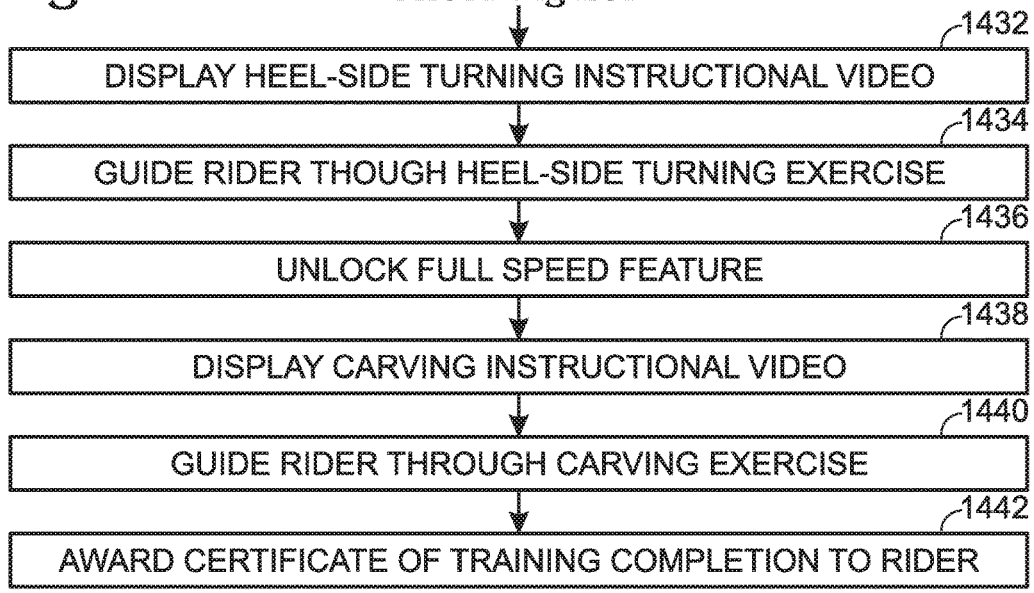

FIGS. 20A and 20B are respective first and second parts a flowchart, and are referred to collectively as FIG. 20.

FIG. 20 depicts multiple steps of a method, generally indicated at 1400, which may be performed by the software application, such as by training feature 826 (see FIG. 14). For example, method 1400 may be an embodiment of method 1300 of FIG. 19. Although various steps of method 1400 are described below and depicted in FIG. 20, the steps need not necessarily all be performed, and in some cases may be performed in a different order than the order shown.

As shown, method 1400 may include a step 1402 of displaying a basic balancing instructional video. At step 1402, the basic balancing instructional video may be displayed on the wireless electronic device by the software application to the rider (or user).

Method 1400 may include a step 1404 of guiding the rider through a basic balancing exercise. For example, at step 1404, the software application may direct the rider to perform the basic balancing exercise on the electric vehicle. In some embodiments, the software application may determine whether the basic balancing exercise was successfully performed.

Method 1400 may include a step 1406 of unlocking a slow-speed (e.g., 2 MPH) forward motion feature and a stopping feature. In some embodiments, the software application may unlock the slow-speed forward motion feature after (or only after) it has been determined that the basic balancing exercise was successfully performed (or completed).

Method 1400 may include a step 1408 of displaying a forward motion and stopping instructional video, and a step 1410 of guiding the rider through a forward motion and stopping exercise. In some embodiments, the software application may determine whether the forward motion and stopping exercise was successfully performed.

Method 1400 may include a step 1412 of unlocking a toe-side turning feature, such as modulation of the rotational rate of the rotor of the motor based on pivotation of the board about the roll axis in a direction opposite to that shown in FIG. 11. In some embodiments, the software application may unlock the toe-side turning feature after (or only after) it has been determined that the forward motion and stopping exercise was successfully performed.

Method 1400 may include a step 1414 of displaying a toe-side turning instructional video, and a step 1416 of guiding the rider through a toe-side turning exercise. In some embodiments, the software application may determine whether the toe-side turning exercise was successfully performed.

Method 1400 may include a step 1418 of unlocking a higher speed feature, such as forward motion at a speed of up to 8 MPH. In some embodiments, the software application may unlock the higher speed feature after (or only after) it has been determined that the toe-side turning exercise was successfully performed.

Method 1400 may include a step 1420 of displaying a speed modulation instructional video. For example, the speed modulation instructional video may show the rider a speed modulation process of increasing the pitch angle to increase the speed of the electric vehicle, and decreasing the pitch angle to decrease the speed of the electric vehicle.

Method 1400 may include a step 1422 of guiding the rider through a speed modulation exercise. For example, at step 1422, the software application may direct the rider to perform one or more steps of the speed modulation process.

Method 1400 may include a step 1424 of unlocking a reversing feature, such as reverse motion as a result to maintaining the rear foot pad below the level orientation, as shown in FIG. 10. In some embodiments, the software application may unlock the reverse motion feature after (or only after) it has been determined that the speed modulation exercise was successfully performed.

Method 1400 may include a step 1426 of displaying a reversing instructional video, and a step 1428 of guiding the rider through a reversing exercise. In some embodiments, the software application may determine whether the reversing exercise was successfully performed.

Similar to step 1412, 1414, 1416, method 1400 may include a step 1430 of unlocking a heel-side turning feature, a step 1432 of displaying a heel-side turning instructional video, and a step 1434 of guiding the rider through a heel-side turning exercise, an example of which is shown in FIG. 11.

Method 1400 may include a step 1436 of unlocking a full speed feature, such as forward and/or reverse motion at a speed of up to 12 MPH. In some embodiments, the software application may unlock the full speed feature after (or only after) it has been determined that the heel-side turning exercise was successfully performed.

Method 1400 may include a step 1438 of displaying a carving instructional video, which may show the rider how to make high-speed turns using modulation of one or more of the roll and yaw angles to module the rotational rate of the rotor relative to the stator.

Method 1400 may include a step 1440 of guiding the rider through a carving exercise, in which the rider may be instructed to complete a plurality of turns at relatively high speeds through modulation of the roll and/or yaw angles.

Method 1400 may include a step 1442 of awarding a certificate of training completion (or virtual certificate) to the rider. Awarding the certificate may be based upon whether it was determined by the software application that the carving exercise, and/or any of the other exercises, were successfully completed. In some embodiments, method 1400 may include awarding a certificate based on successful performance of one or more of the previously performed exercises, at any of steps 1404, 1410, 1416, 1422, 1428, 1434. For example, step 1418 may include unlocking the higher speed feature and awarding a certificate based on successful completion of the toe-side turning exercise.

Illustrative Communication Systems

Figure 21:
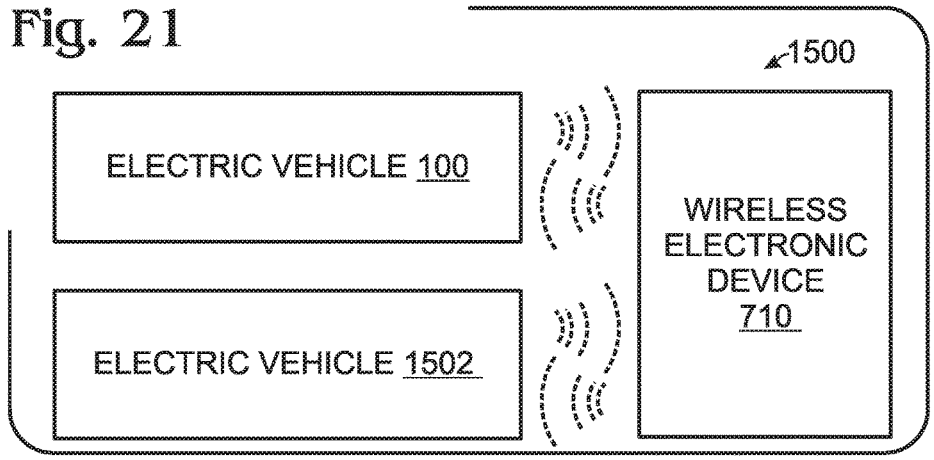
FIG. 21 is a schematic diagram of a system including the wireless electronic device in communication with multiple electric vehicles.

FIG. 21 shows a system, generally indicated at 1500. System 1500 may include electric vehicle 100 and an electric vehicle 1502, which may be similar to vehicle 100, in communication with wireless electronic device 710. For example, vehicle 1502 may include a transmitter and a receiver similar to those of vehicle 100 (see FIG. 13), that are capable of establishing a wireless data-communication link between device 710 and vehicle 1502. System 1500 may be desirable in a situation in which one user wishes to wirelessly connect to both of vehicles 100, 1502 to monitor and/or alter a configuration of either of vehicles 100, 1502. For example, the one user may be a parent who may be riding vehicle 100, and a child of the parent may be riding vehicle 1502. The wireless data-communication link formed between device 710 and vehicles 100, 1502 may enable the parent, while riding with the child, to alter the riding mode of vehicle 1502 to match the abilities of the child and to alter the riding mode of vehicle 100 to match a power consumption of vehicle 100 to that of vehicle 1502.

System 1500 may enable device 710 to monitor and/or alter the respective configurations of vehicles 100, 1502, either independently or substantially simultaneously. For example, a technician may operate device 710 to update the respective firmware of vehicles 100, 1502 at substantially the same time, or may enable the technician to sequentially update vehicles 100, 1502.

In some embodiments, system 1500 may enable the technician or other user, to reconfigure the electrical components of vehicle 1502 to match a configuration of the electrical components of vehicle 100. For example, a rider of vehicle 1502 may be friends with a rider of vehicle 100. Vehicle 100 may have a configuration (e.g., a particular gain, and/or other settings) that the rider of vehicle 1502 desires to apply to vehicle 1502, in which case, either of the riders may use device 710 to read the configuration of vehicle 100 (e.g., via the software application), and to reconfigure vehicle 1502 accordingly. In some embodiments, the software application may include a feature that automatically reconfigures vehicle 1502 to match a configuration of vehicle 100.

Figure 22:
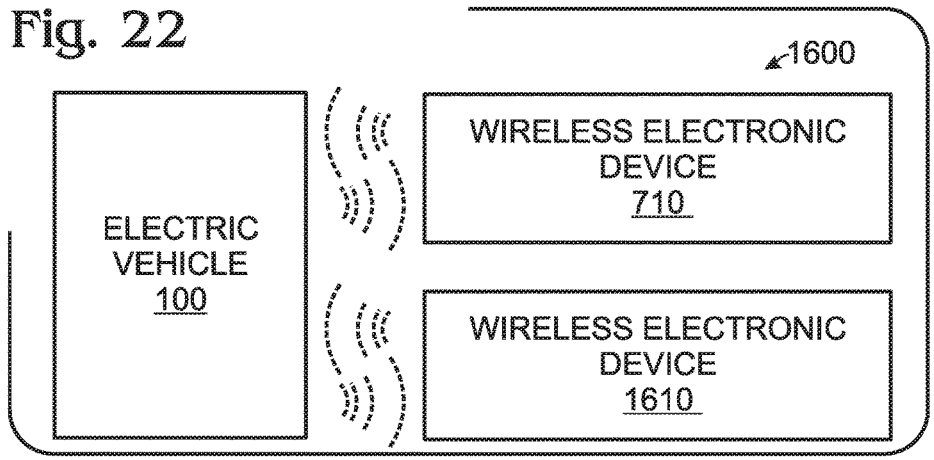
FIG. 22 is a schematic diagram of a system including the electric vehicle in communication with multiple wireless electronic devices.

FIG. 22 shows a system, generally indicated at 1600. System 1600 may include vehicle 100 in communication with device 710, and a wireless electronic device 1610. A first wireless data-communication link may be formed between device 710 and vehicle 100, and a second wireless data-communication link may be formed between device 1610 and vehicle 100. Device 1610 may be similar to device 710. For example, device 1610 may be running a software application similar to application 800 (see FIG. 14). System 1600 may be useful for coaching a rider of vehicle 100. For example, a trainee may be holding device 710 and may be positioned on vehicle 100, and a trainer may be holding device 1610 and may be positioned remote from vehicle 100. The trainee may use the software application running on device 710 to monitor and/or alter a configuration of vehicle 100 and/or receive training information via feature 826 (see FIG. 14). The trainer may use the software application running on device 1610 to similarly monitor and/or alter a configuration of vehicle 100 and/or send training information to device 710 via vehicle 100. In some embodiments, devices 710, 1610 may be in direct communication with one another via one or more wireless data-communication links, and the trainee and the trainer may monitor and/or alter a configuration of vehicle 100 through a mutual data-communication link established between one of the devices and the electric vehicle, and/or mutually share training information.

Illustrative Data Processing System

Figure 23:
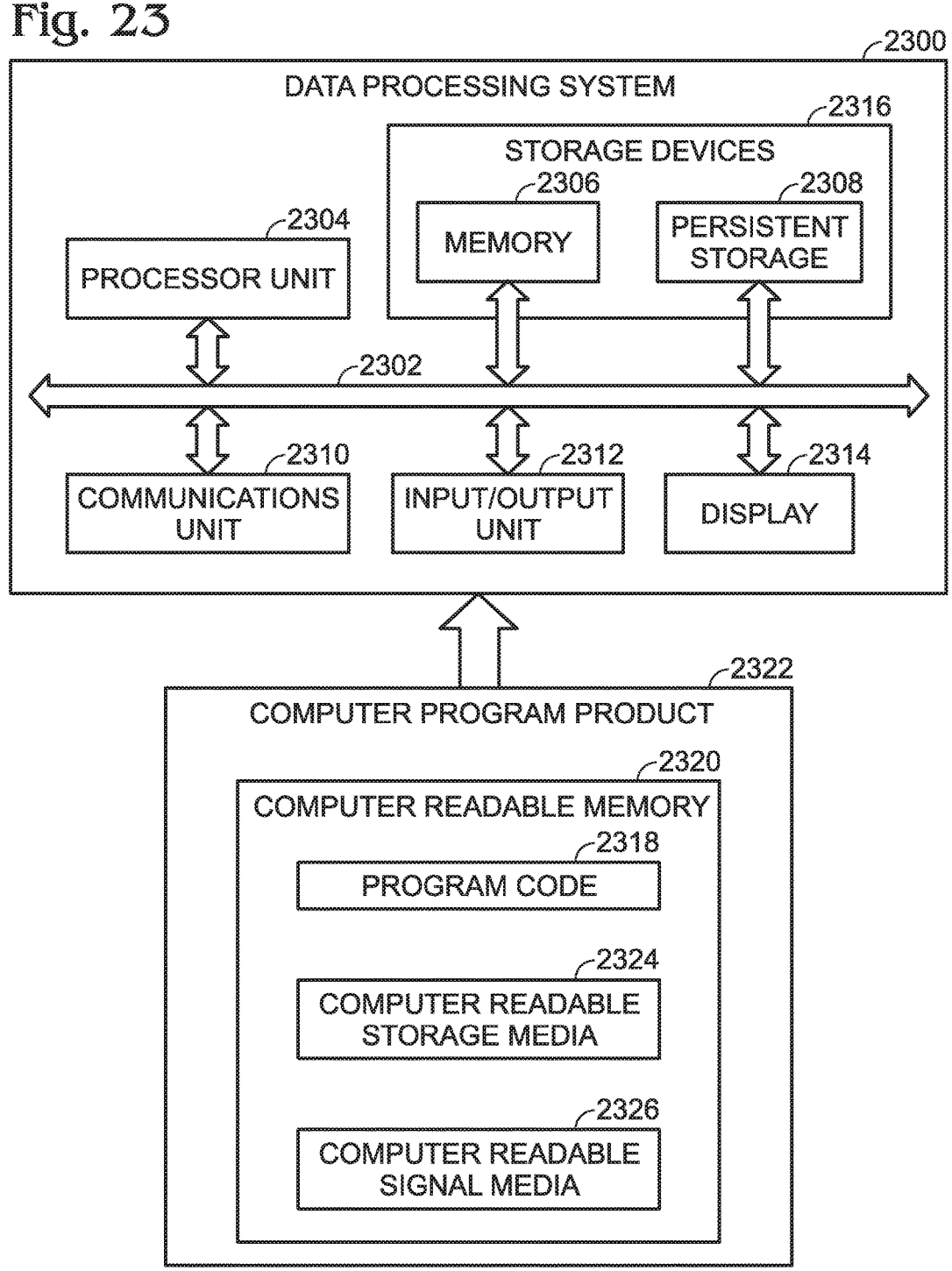
FIG. 23 is a schematic diagram of an illustrative data processing system.

FIG. 23 depicts a data processing system 2300, also referred to as a computer, in accordance with aspects of the present disclosure. In this example, data processing system 2300 is an illustrative data processing system for implementing one or more of the operations and/or functions depicted in FIGS. 1-22, and 24-29 and/or described in relation thereto. More specifically, in some examples, devices that are embodiments of data processing systems (e.g., onboard computers, chips, and electronic systems) may be programmed or otherwise configured to carry out functions such as motor control, hysteresis algorithms, rider presence information signal processing, power supply management, microcontroller operations, and/or sensor control.

Data processing system 2300 may include a communications framework 2302. Communications framework 2302 provides communications between a processor unit 2304, a memory 2306, a persistent storage 2308, a communications unit 2310, an input/output (I/O) unit 2312, and a display 2314. Memory 2306, persistent storage 2308, communications unit 2310, input/output (I/O) unit 2312, and display 2314 are examples of resources accessible by processor unit 2304 via communications framework 2302.

Processor unit 2304 serves to run instructions for software that may be loaded into memory 2306. Processor unit 2304 may be a number of processors, a multi-processor core, or some other type of processor, depending on the particular implementation. Further, processor unit 2304 may be implemented using a number of heterogeneous processor systems in which a main processor is present with secondary processors on a single chip. As another illustrative example, processor unit 2304 may be a symmetric multi-processor system containing multiple processors of the same type.

Memory 2306 and persistent storage 2308 are examples of storage devices 2316. A storage device is any piece of hardware that is capable of storing information, such as, for example, without limitation, data, program code in functional form, and other suitable information either on a temporary basis or a permanent basis.

Storage devices 2316 also may be referred to as computer readable storage devices in these examples. Memory 2306, in these examples, may be, for example, a random access memory or any other suitable volatile or non-volatile storage device. Persistent storage 2308 may take various forms, depending on the particular implementation.

For example, persistent storage 2308 may contain one or more components or devices. For example, persistent storage 2308 may be a hard drive, a flash memory, a rewritable optical disk, a rewritable magnetic tape, or some combination of the above. The media used by persistent storage 2308 also may be removable. For example, a removable hard drive may be used for persistent storage 2308.

Communications unit 2310, in these examples, provides for communications with other data processing systems or devices. In these examples, communications unit 2310 is a network interface card. Communications unit 2310 may provide communications through the use of either or both physical and wireless communications links.

Input/output (I/O) unit 2312 allows for input and output of data with other devices that may be connected to data processing system 2300. For example, input/output (I/O) unit 2312 may provide a connection for user input through a keyboard, a mouse, and/or some other suitable input device. Further, input/output (I/O) unit 2312 may send output to a printer. Display 2314 provides a mechanism to display information to a user.

Instructions for the operating system, applications, and/or programs may be located in storage devices 2316, which are in communication with processor unit 2304 through communications framework 2302. In these illustrative examples, the instructions are in a functional form on persistent storage 2308. These instructions may be loaded into memory 2306 for execution by processor unit 2304. The processes of the different embodiments may be performed by processor unit 2304 using computer-implemented instructions, which may be located in a memory, such as memory 2306.

These instructions are referred to as program instructions, program code, computer usable program code, or computer readable program code that may be read and executed by a processor in processor unit 2304. The program code in the different embodiments may be embodied on different physical or computer readable storage media, such as memory 2306 or persistent storage 2308.

Program code 2318 is located in a functional form on computer readable media 2320 that is selectively removable and may be loaded onto or transferred to data processing system 2300 for execution by processor unit 2304. Program code 2318 and computer readable media 2320 form computer program product 2322 in these examples. In one example, computer readable media 2320 may be computer readable storage media 2324 or computer readable signal media 2326.

Computer readable storage media 2324 may include, for example, an optical or magnetic disk that is inserted or placed into a drive or other device that is part of persistent storage 2308 for transfer onto a storage device, such as a hard drive, that is part of persistent storage 2308. Computer readable storage media 2324 also may take the form of a persistent storage, such as a hard drive, a thumb drive, or a flash memory, that is connected to data processing system 2300. In some instances, computer readable storage media 2324 may not be removable from data processing system 2300.

In these examples, computer readable storage media 2324 is a physical or tangible storage device used to store program code 2318 rather than a medium that propagates or transmits program code 2318. Computer readable storage media 2324 is also referred to as a computer readable tangible storage device or a computer readable physical storage device. In other words, computer readable storage media 2324 is a media that can be touched by a person.

Alternatively, program code 2318 may be transferred to data processing system 2300 using computer readable signal media 2326. Computer readable signal media 2326 may be, for example, a propagated data signal containing program code 2318. For example, computer readable signal media 2326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2318 may be downloaded over a network to persistent storage 2308 from another device or data processing system through computer readable signal media 2326 for use within data processing system 2300. For instance, program code stored in a computer readable storage medium in a server data processing system may be downloaded over a network from the server to data processing system 2300. The data processing system providing program code 2318 may be a server computer, a client computer, or some other device capable of storing and transmitting program code 2318.

The different components illustrated for data processing system 2300 are not meant to provide architectural limitations to the manner in which different embodiments may be implemented. The different illustrative embodiments may be implemented in a data processing system including components in addition to and/or in place of those illustrated for data processing system 2300. Other components shown in FIG. 23 can be varied from the illustrative examples shown. The different embodiments may be implemented using any hardware device or system capable of running program code. As one example, data processing system 2300 may include organic components integrated with inorganic components and/or may be comprised entirely of organic components excluding a human being. For example, a storage device may be comprised of an organic semiconductor.

In another illustrative example, processor unit 2304 may take the form of a hardware unit that has circuits that are manufactured or configured for a particular use. This type of hardware may perform operations without needing program code to be loaded into a memory from a storage device to be configured to perform the operations.

For example, when processor unit 2304 takes the form of a hardware unit, processor unit 2304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 2318 may be omitted, because the processes for the different embodiments are implemented in a hardware unit.

In still another illustrative example, processor unit 2304 may be implemented using a combination of processors found in computers and hardware units. Processor unit 2304 may have a number of hardware units and a number of processors that are configured to run program code 2318. With this depicted example, some of the processes may be implemented in the number of hardware units, while other processes may be implemented in the number of processors.

In another example, a bus system may be used to implement communications framework 2302 and may be comprised of one or more buses, such as a system bus or an input/output bus. Of course, the bus system may be implemented using any suitable type of architecture that provides for a transfer of data between different components or devices attached to the bus system.

Additionally, communications unit 2310 may include a number of devices that transmit data, receive data, or both transmit and receive data. Communications unit 2310 may be, for example, a modem or a network adapter, two network adapters, or some combination thereof. Further, a memory may be, for example, memory 2306, or a cache, such as that found in an interface and memory controller hub that may be present in communications framework 2302.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Illustrative Rider Detection Devices, Systems, and Methods

As shown in FIGS. 24-28, this section describes illustrative rider detection systems and methods. These rider detection systems and methods relate to various examples of the rider detection device described above (i.e., device 262).

Figure 24:
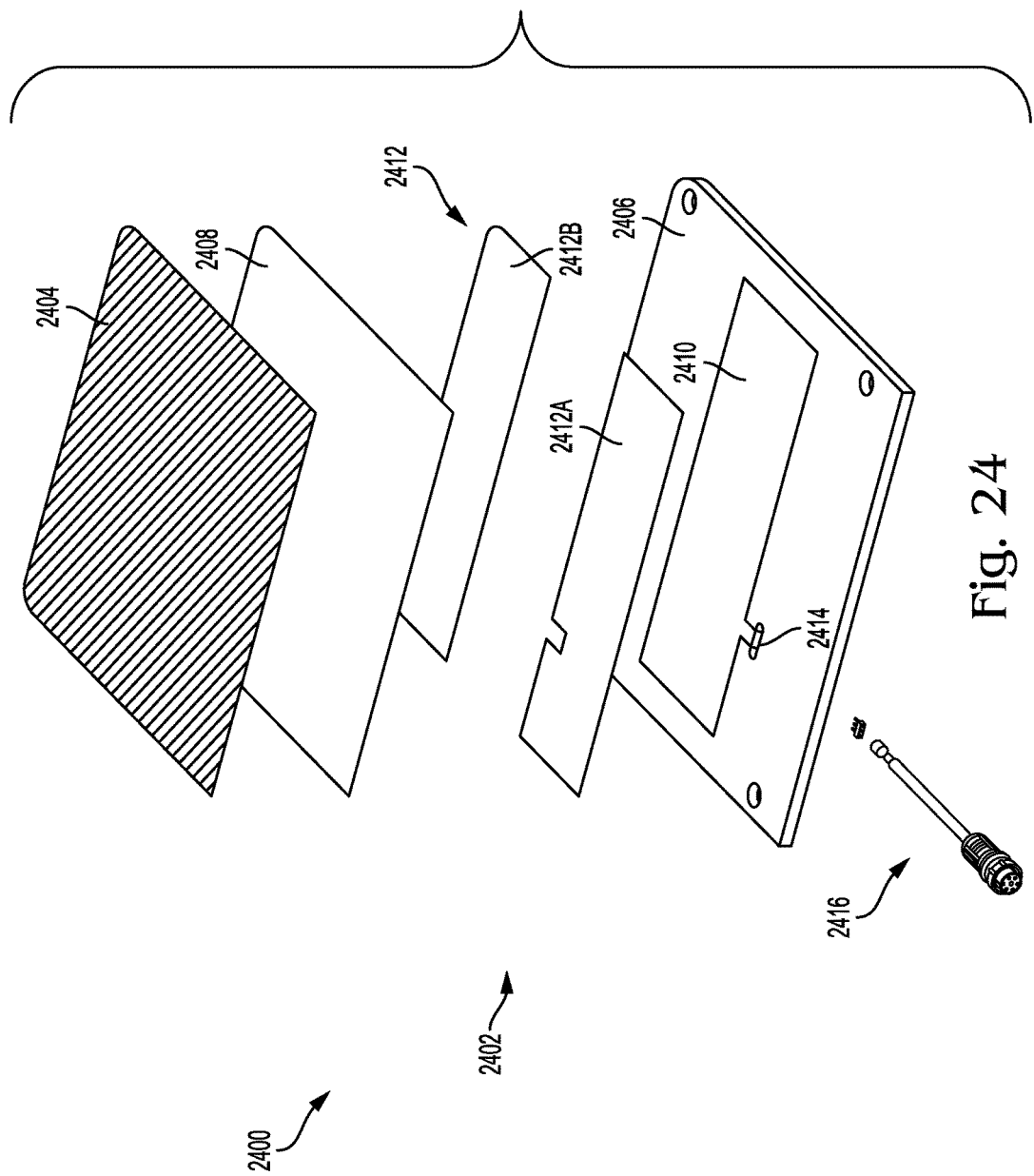
FIG. 24 is an isometric exploded view of an illustrative rider detection device including a deck and pressure-sensing transducer suitable for use in an electric vehicle in accordance with aspects of the present disclosure.
Figure 25:
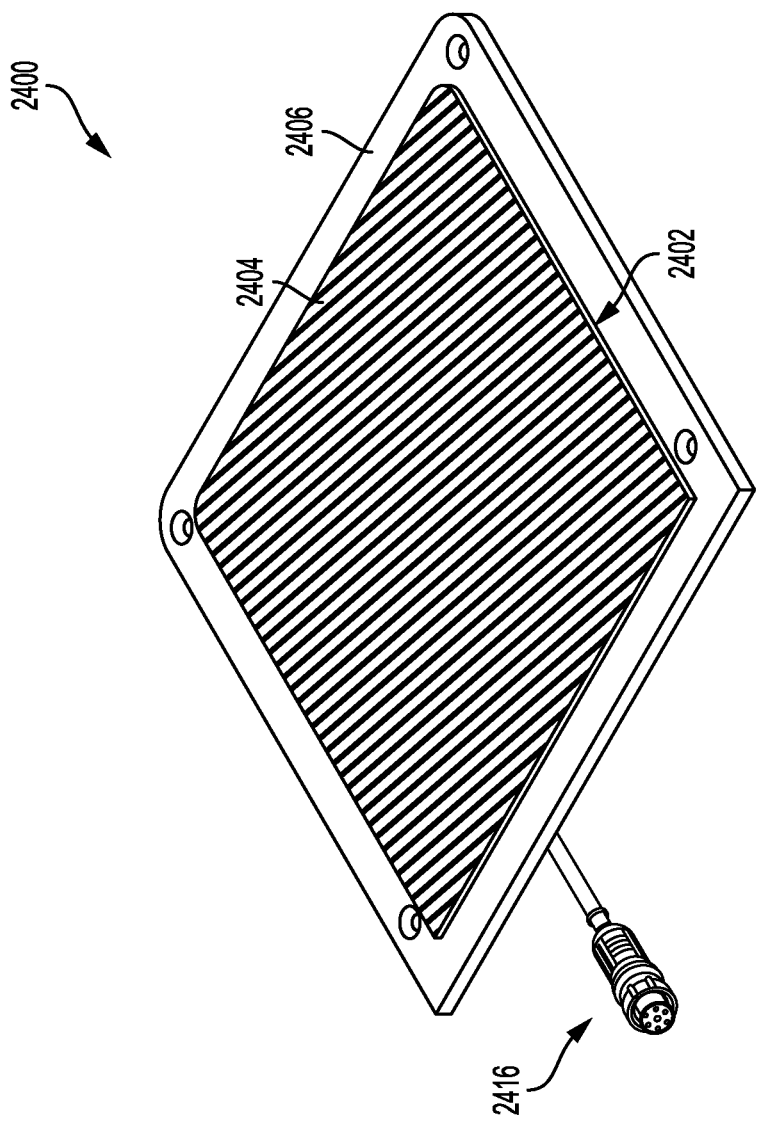
FIG. 25 is an isometric assembled view of the device of FIG. 24.
Figure 26:
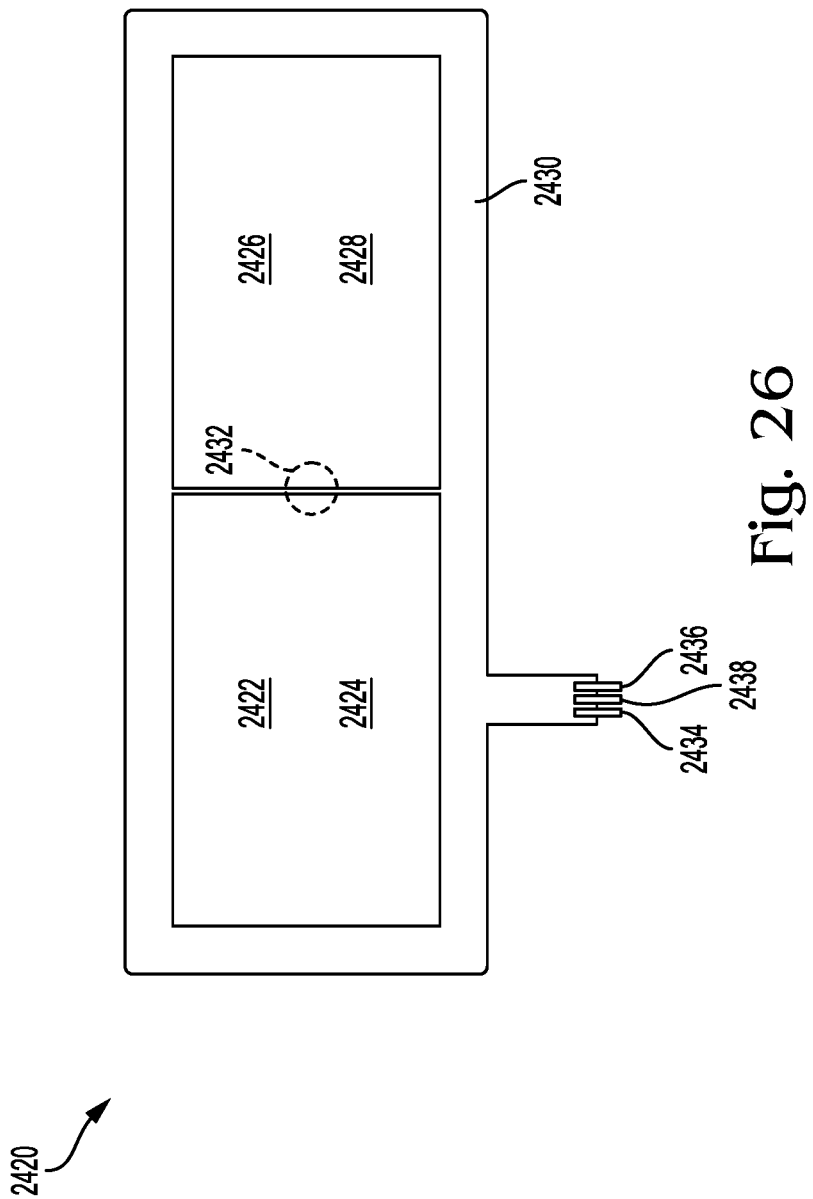
FIG. 26 is a schematic top view of another illustrative rider detection device including first and second sensing elements.
Figure 27:
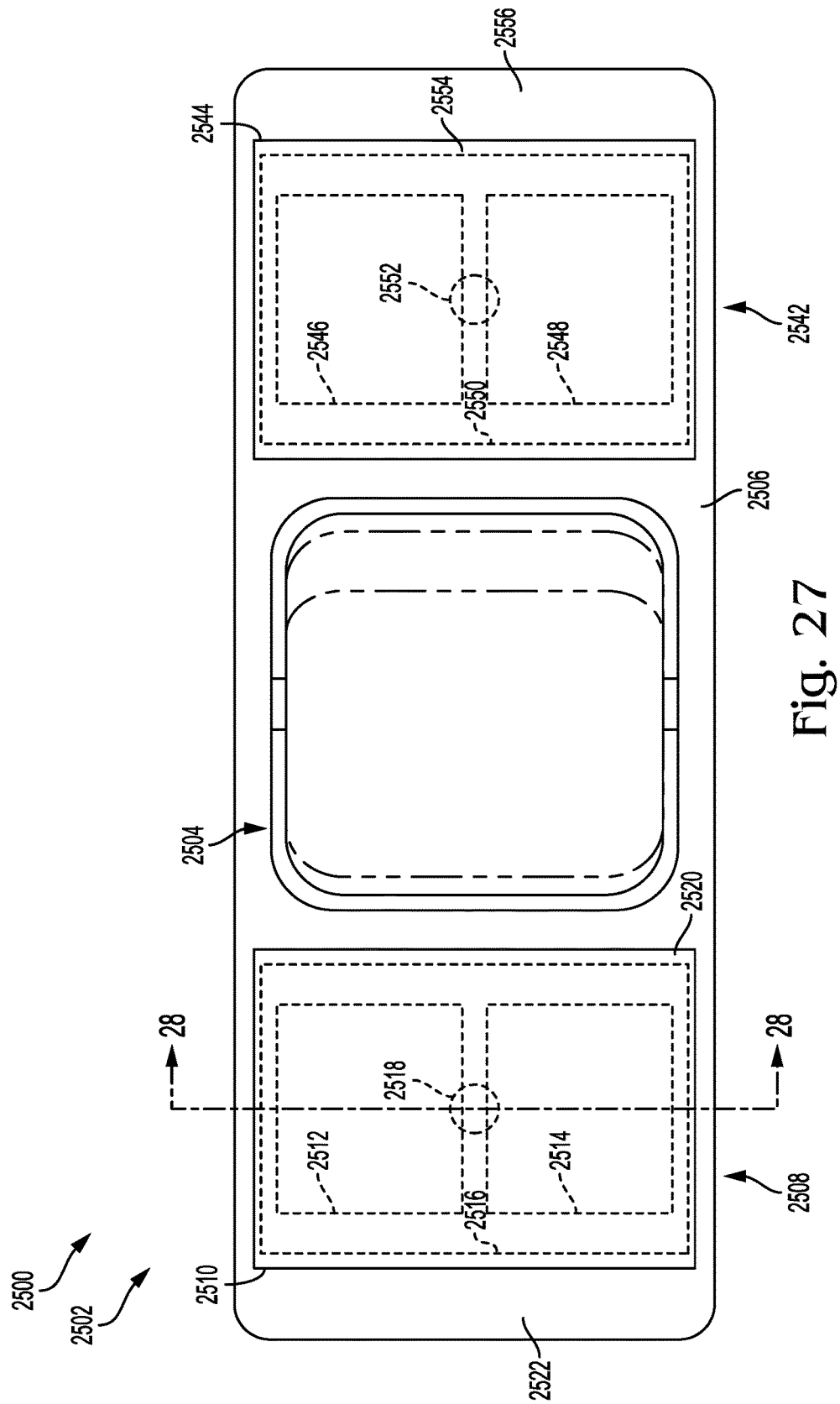
FIG. 27 is a schematic overhead view depicting the device of FIG. 26 integrated into a deck of an electric vehicle in accordance with aspects of the present disclosure.
Figure 28:
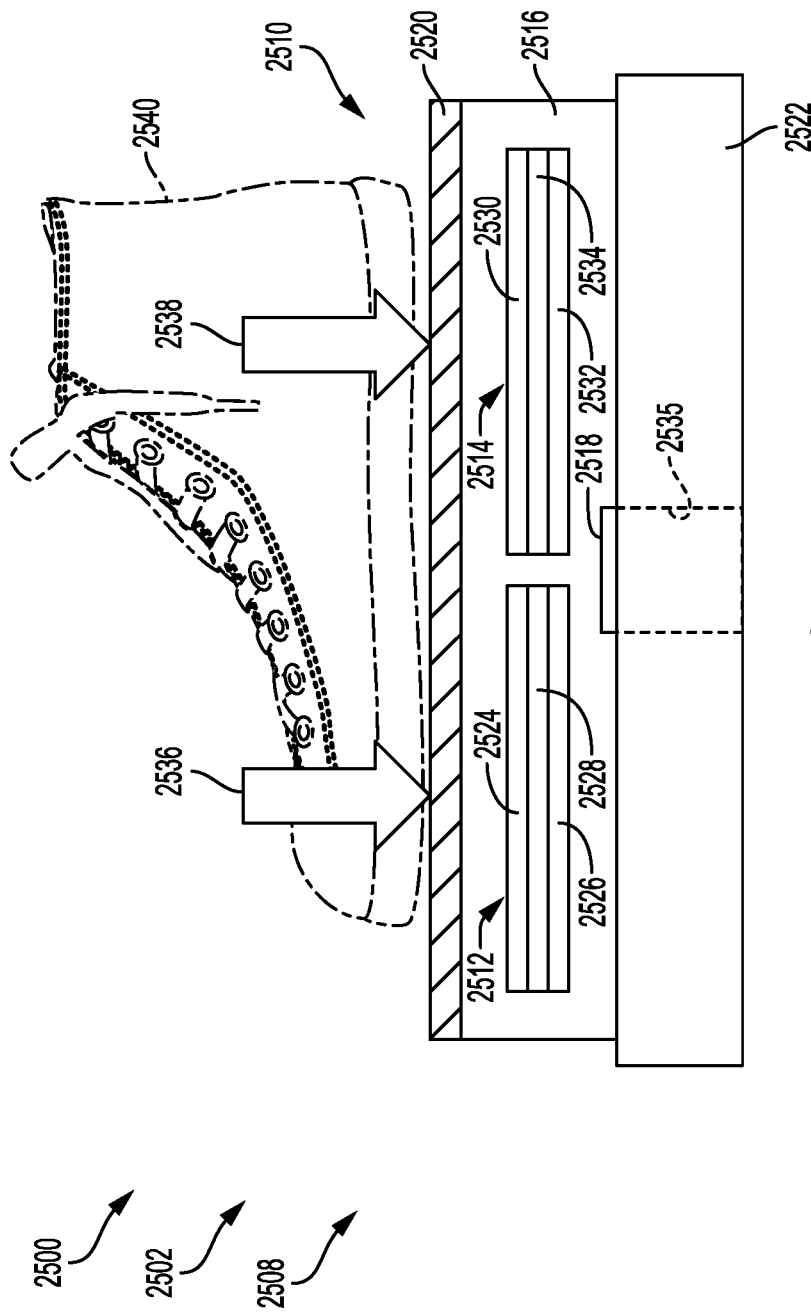
FIG. 28 is a schematic sectional view of the deck and rider detection device of FIG. 27, taken along line 28-28.

FIGS. 24 and 25 depict an illustrative pressure-sensing transducer suitable for use in a rider detection system. FIG. 26 is an overhead view of a similar pressure-sensing transducer. FIG. 27 is an overhead view of an electric vehicle, including multiple such transducers in corresponding deck portions. FIG. 28 is a schematic sectional view of the system of FIG. 27.

In general, a rider detection device, system, or sensor for a personal electric vehicle having zero or more ground-contacting elements (e.g., wheels) may comprise a flexible, resilient, or rigid circuit having one or more sensing elements integrated into a single substrate. The rider detection sensor includes a pressure-sensing transducer configured to convert a sensed force or pressure into an electrical signal. A pressure-sensing transducer may have one or more fully conductive layers and/or one or more partially conductive layers. In some examples, a partially conductive layer may be proportionally conductive, such that the conductivity of the layer is proportional to the applied pressure or force. In some examples, e.g., where one or more of the layers are partially conductive, the sensing element(s) may include a force-sensitive resistor, such as the Force Sensing Resistor® produced by Sensitronics, LLC. A layer in this context may have a width and length substantially greater than its thickness or depth. Accordingly, such a layer may be described as an expanse.

A force-sensitive resistor (FSR) includes a material or layer that predictably changes electrical resistance in response to a force being applied to the layer. More specifically, the electrical resistance of a force-sensitive resistor decreases as force is applied, e.g., proportionally. Force-sensitive resistors may include one or more conductive polymers. In some examples, a force-sensitive resistor material may take the form of a polymer sheet, a polymer layer, or a printable ink. Printable force-sensitive resistor inks may be screen printed or otherwise applied onto a film substrate, such as a polyethylene terephthalate (PET) film. In some examples, the term FSR may be used to describe the specific layer of a transducer that includes, for example, the conductive polymer. In some examples, the term FSR may be used to refer to a transducer that includes one or more layers of FSR material.

The rider detection sensor, which may be constructed using printed circuit fabrication processes, may include a transducer having one or more conductive layers. For example, a pair of fully and/or proportionally conductive layers may be spaced from and face each other. At least one of the two layers may be resilient or flexible, such that the layer is displaced when a force is applied, thereby contacting the other layer and completing an electrical circuit. As mentioned above, one of the layers may include a force-sensitive resistor, such that the electrical conductivity of that layer is variable depending on the force applied (e.g., the layer resistance is proportional to the force applied). In examples that include a force sensitive resistor, the transducer as a whole will be proportionally responsive to an applied pressure. In examples that include only fully conductive layers, the transducer response will be substantially binary (i.e., on/off).

A layer of the rider detection sensor may have relatively small displacement, such that the displacement is not detectable by the rider. For example, deflection or displacement of a sensor may be in a range of about 0.005 to 0.020 inches. More specifically, when a rider applies activation force or pressure to a sensor, a separation distance between layers may be reduced by about 0.005 to 0.020 inches. This amount is for illustration only, and other separation and/or displacement distances may be appropriate. Deactivation of the rider detection sensor element (e.g., by removal of activation pressure or force) may result in the associated conductive layers moving relative to one another to restore the separation distance. For example, as described above, one or both layers may comprise a resilient material.

In some examples, an FSR-type transducer will be used to facilitate a more robust rider sensing system. For example, various factors may cause a baseline amount of pressure to be placed upon the rider detection sensor, such as the application of additional layers of material above and/or below the sensor. One advantage an FSR will have in this situation, as opposed to a purely binary sensor, is its proportional response. Although the sensor may be activated to some degree by the baseline pressure, the FSR will only become partially conductive. Accordingly, a threshold level can be set, above which the sensor will indicate a rider's presence, and below which the sensor will indicate that no rider is present. This threshold can be set above the baseline level, to avoid false positive readings.

In some examples, the rider detection sensor may be made weather-resistant by encasing the rider detection sensor or transducer element in a waterproof enclosure, e.g., using waterproof bonding. An air- or vapor-permeable, water-impermeable vent, such as a Gore vent, may be included to allow the rider detection sensor to equilibrate to changes in atmospheric pressure while maintaining waterproof sealing. One suitable example of such a vent is a TEMISH® venting system, S-NTF series, produced by the Nitto Denko Corporation.

In some examples, multiple sensing zones (e.g., each defined by a respective sensing transducer) may be included on a single rider detection sensor. The use of multiple zones may enable increased accuracy, better responsiveness to different sources of pressure, and/or can allow different conditions to begin operation, continue operation, and/or halt operation of the vehicle.

In one example, a vehicle such as a self-stabilizing skateboard may include first and second sensor zones having associated active areas under the rider's heel and toe. For example, the first and second sensor zones may be separated from one another by a gap or other region extending substantially parallel to a direction of travel of the skateboard and/or substantially perpendicular to a pitch axis of a centrally disposed wheel of the skateboard. In other words, one pressure-sensing transducer may be adjacent to and laterally spaced from another pressure-sensing transducer, such that the pressure-sensing transducers are configured to be disposed beneath a front portion and a rear portion, respectively, of the foot of the rider. In some embodiments, the rider detection sensor may be fabricated with highly durable polycarbonate/PET materials and sealed with a wide waterproof border.

In an exemplary operation, active balancing may be initialized or initiated in response to both zones being pressed. Depression of only one (or at least one) zone may permit continued riding (e.g., continued active balancing). Such an operational configuration may permit relatively aggressive heel-side and toe-side turns, where the rider may lift a heel or toe, while maintaining the other part of the foot in contact with the skateboard deck (e.g., thereby depressing an associated sensor zone).

In some examples, when the rider slows the skateboard (or other type of vehicle incorporating the rider detection sensor) below a safe speed specified by software or firmware (such as that which may be included in an associated motor controller), the system may be configured to stop actively balancing the vehicle if the user lifts or otherwise removes a heel or toe from the board. Accordingly, removing pressure from an associated sensor zone may permit the vehicle to come to a stop. Vehicle speed may be measured or sensed by any suitable device or method. For example, a speed sensing device may be associated with the rotational speed of a wheel of the vehicle.

In some examples, the rider detection sensor may be made using circuit printing processes typical in the membrane keypad industry and/or the force-sensitive resistor (FSR) industry. In some embodiments, printed conductor layers may be separated by a spacer layer, which may prevent the rider detection sensor from being triggered when not loaded.

In some embodiments, the rider detection sensor may be located on a rigid part of a footpad of the vehicle, and sandwiched between a slip-resistant (e.g., grip tape) layer disposed over the rider detection sensor and a rigid part of the footpad disposed under the rider detection sensor. Such a configuration may improve sensor reliability. For example, in such a configuration, the rider detection sensor may have no moving parts, or the parts may not move significantly relative to one another. Due to the printed nature of some sensors (and/or other factors), additional sensor zones can be added without significantly increasing costs.

Turning to FIGS. 24 and 25, an illustrative rider detection system 2400 is shown in exploded and assembled views. System 2400 comprises an example of rider detection device 262, and is suitable for use in the system described above, with respect to FIG. 5. System 2400 includes a pressure-sensing transducer 2402 disposed (e.g., sandwiched) between a slip-resistant layer 2404 and a deck portion 2404 of an electric skateboard, such as vehicle 100 described above.

Pressure-sensing transducer 2402, interchangeably referred to as a force-sensing or force-sensitive transducer, may include any suitable structure and/or device configured to convert a sensed mechanical force into an electrical signal. In the example shown in FIG. 24, pressure-sensing transducer comprises an upper force-sensitive resistor (FSR) layer 2408 and a lower conductive layer 2410, separated by a gapping or spacer layer 2412. In this example, the spacer layer includes two portions, a first spacer portion 2412A and a second spacer portion 2412B.

FSR layer 2408 may include any suitable layer having an electrical resistance that changes predictably in response to an applied force. For example, FSR layer 2408 may include a conductive polymer ink applied to a PET film substrate. In some examples, the substrate may comprise a conductive polymer rather than the printed ink. FSR layer 2408 may be referred to as partially conductive and/or variably conductive.

Conductive layer 2410 may include any suitable conductive material, such as a partial electrical circuit. For example, conductive layer 2410 may include a pattern of silver or copper printed or otherwise applied to a film substrate. In some examples, the pattern may include interlocking or interdigitated portions (e.g., fingers).

In operation, FSR layer 2408 may be displaced toward conductive layer 2410 by an applied mechanical force (i.e., pressure), such as by the foot of a rider. Contact between the two layers results in a completion of an electrical circuit, allowing a signal to be generated indicating that a rider is present. Because the FSR layer has a variable resistance, additional information may be communicated or measured, e.g., based on the amount of current flowing through the circuit. In some cases, as described above, a certain baseline level of activation may be caused by squeezing the FSR and conductive layers between slip-resistant layer 2404 and deck portion 2404. As shown in FIG. 24, conductive layer 2410 may include a portion that passes through an aperture 2414 in deck portion 2406 to connect with a suitable electrical connector 2416. Connector 2416 may include any suitable electrical connector configured to place transducer 2402 in communication with a controller, such as motor controller 254 and/or microcontroller 269 (see FIG. 5).

Spacer 2412 may include any suitable non-conductive, e.g., dielectric, material configured to keep FSR layer 2408 and conductive layer 2410 separated absent an applied force. In some examples, spacer 2412 may include one or more layer portions (e.g., portion 2412A and 2412B) having a thickness greater than that of conductive layer 2410 and placed on opposing lateral sides of the conductive layer, thereby holding FSR layer 2408 above the conductive layer. In some examples, spacer 2412 may include one or more portions configured to be sandwiched between FSR layer 2408 and conductive layer 2410, such that the spacer portions are disposed only on a periphery of the layers, thereby leaving central or middle portions of each layer free to interact.

Slip-resistant layer 2404 may be disposed above transducer 2402, and may include any suitable material configured to provide a durable, traction-enhancing surface for a rider's foot. For example, slip-resistant layer 2404 may include a non-skid material, grip tape, a textured layer, and/or the like, or any combination of these. Slip-resistant layer 2404 may be similar in size or larger than transducer 2402, such that the transducer is also protected to some degree by the slip-resistant layer. Slip-resistant layer 2404 may be an example of portions 124, 128, described above.

FSR layer 2408 has been described as being disposed above conductive layer 2410. However, some examples may have this arrangement reversed, such that the FSR layer is the lower layer. Some examples may include more or fewer of each type of layer. For example, a transducer/sensor may include only a single FSR layer. Any suitable combination of layers may be utilized.

FIG. 26 depicts an illustrative pressure- or force-sensing sensor region 2420 suitable for use in a rider detection system such as system 2400. Similar to transducer 2402, sensor region 2420 may be incorporated into such a system, for example, by sandwiching the sensor region between a grip tape layer and a rigid portion of the vehicle's board or deck. As described further below, sensor region 2420 may include a plurality of side-by-side pressure- or force-sensing transducers, each of which defines a different active area or discrete sensing zone.

As depicted in FIG. 26, sensor region 2420 includes a first pressure-sensing transducer 2422 defining a first active area (or discrete zone) 2424; a second pressure-sensing transducer 2426 defining a second active area (or discrete zone) 2428; a waterproof housing or enclosure 2430 enclosing transducers 2422 and 2424; a vent 2432 configured to permit barometric equilibrium of an internal space inside enclosure 2430 with an exterior environment; and electrical contacts 2434, 2436, 2438 in electrical communication with the transducers.

Each of transducers 2422 and 2426 may include at least partially conductive first and second layers separated by a spacer layer. In some examples, one or both transducers include a resilient first conductive layer spaced from and facing a second conductive layer, such that a force applied to the first conductive layer causes the first conductive layer to contact the second conductive layer. In some examples, one or both transducers include an FSR layer, similar to that described above with respect to FIGS. 24-25.

Contacts 2434 and 2436 may be electrically connected to transducers 2422 and 2426, respectively. Contact 2438 may be a ground connection. When force or pressure is applied to first zone 2424 (e.g., by a rider's foot), thereby reducing or closing a separation distance between the first and second layers of transducer 2422, rider presence information (e.g., a rider-present signal) may be output on contact 2434.

Similarly, force or pressure applied to second zone 2428 may cause a similar output on contact 2436. These signals may be communicated to the motor controller, which may use the rider presence information to determine an appropriate state for the motor assembly of the vehicle (e.g., stopping, or rotating the wheel in a forward or reverse direction). In some examples, contact 2434 may be a drive line (e.g., a toe drive line) associated with first transducer 2422; contact 2436 may be a drive line (e.g., a heel drive line) associated with second transducer 2426; and contact 2438 may be a sense line.

In an exemplary use of sensor region 2420, the sensor region may be positioned or embedded in a platform of a self-stabilizing vehicle (e.g., vehicle 100), such that first zone 2424 registers with a first portion of a user's foot (e.g., a toe region), and second zone 2428 registers with a second portion of the user's foot (e.g., a heel region). Simultaneously activation of zones 2424 and 2428 may initialize active balancing of the vehicle, for example, via reception of the rider-presence information from respective contacts 2434 and 2436 by a motor controller. Once the vehicle is in an active balancing mode or state, the user may tilt the deck (e.g., in a direction substantially perpendicular to a heel-toe direction) to propel the vehicle along a direction of travel.

After the vehicle achieves a predetermined or selected threshold speed (e.g., 3 MPH), the motor controller (or other controller) may be configured to continue active balancing of the vehicle, e.g., by driving the motor, even if pressure is removed from one or more of zones 2424 and 2428. This may occur, for example, while performing heel and/or toe side turns. However, when the vehicle is being operated below the predetermined or selected threshold speed, removal of pressure from one or both zones may be configured to stop and/or slow active balancing of the vehicle. For example, removal of pressure from zone 2428 (e.g., associated with the rider's heel) may be configured to send a rider-not-present signal to the motor controller via contact 2436. If the vehicle is traveling below the threshold speed, rider presence information indicating absence of the rider may cause the motor controller to de-energize the motor and/or send a drive signal to the motor sufficient to bring the vehicle to rest. In a similar manner, removal of pressure from zone 2424 may be configured to bring the vehicle to rest when traveling below the predetermined speed, even if zone 2428 is activated (or vice versa).

A controller or control circuit for the motor may incorporate hysteresis to more predictably or more intuitively change modes of the vehicle. For example, a control circuit similar to or incorporating a Schmitt trigger may be used to bias the vehicle toward continued operation at higher speeds and biased toward non-operation at lower speeds. A voltage threshold and/or time-off setting may be adjustable for this purpose. See below for additional description of an illustrative method of operation.

FIGS. 27 and 28 depict a rider detection system 2500 having aspects similar to rider detection system 2400 and sensor region 2420, and suitable for use in an electric vehicle such as vehicle 100. System 2500 comprises an example of rider detection device 262, and is suitable for use in the system described above, with respect to FIG. 5. System 2500 may include a vehicle such as a self-stabilizing skateboard 2502 having a wheel assembly 2504 coupled to a deck 2506. This wheel assembly and deck are substantially similar to those described above, with respect to vehicle 100, wheel assembly 112, and deck 104.

As depicted in FIGS. 27 and 28, a first rider detection unit 2508 (also referred to as a rider detection device, sensing region, or sensor region) may be integrated into, coupled to, connected to, embedded in, or disposed on a first footpad 2510 of deck 2506. Rider detection unit 2508 may be similar to sensor region 2420 of FIG. 26. For example, unit 2508 may include first and second sensing transducers 2512 and 2514 encased in a waterproof enclosure 2516 having a vent 2518 (similar to vent 2432) configured to permit barometric equilibrium between an internal space and an external environment.

As shown in FIG. 28, unit 2508 may be sandwiched between a slip-resistant layer 2520, such as grip tape, and a board portion 2522 of deck 2506. Board portion 2522 is a substantially rigid portion of deck 2506. For example, board portion 2522 may comprise plywood, fiberglass, and/or other substantially rigid material. In some examples, enclosure 2516 may be bonded in a waterproof fashion to slip-resistant layer 2520 and/or board portion 2522.

Transducer 2512 may include a first and a second conductive layer 2524, 2526 separated by a spacer layer 2528. Similarly, transducer 2514 may include a third and a fourth conductive layer 2530, 2532 separated by a spacer layer 2534. As described above, these conductive layers may include one or more FSR layer(s). Each transducer may be configured to provide a variable output signal (e.g., force-proportional), to provide a binary on/off signal, or to be selectable between these two modalities.

In the example depicted in FIG. 28, vent 2518 is disposed in an interface region between enclosure 2516 and board portion 2522. However, in some examples, the vent may be positioned in other suitable positions adjacent or peripheral to enclosure 2516. In some embodiments, a hole or aperture 2535 may be formed in board portion 2522 directly under vent 2518 (or in another suitable location), thereby placing vent 2518 in fluid communication with the exterior environment. This arrangement may facilitate greater airflow into and out of the interior space of rider detection unit 2508, in which interior space transducers 2512 and 2514 are disposed.

As depicted in FIG. 28, a rider's foot may press down on rider detection unit 2508 with a force that is generally balanced variably between two force vectors. More specifically, a toe force vector 2536 describes the normal force applied to foot pad 2510 (and thus to unit 2508) by a front or toe portion of the rider's foot. Similarly, a heel force vector 2538 describes the normal force applied to foot pad 2510 by a rear or heel portion of the rider's foot. In some examples, the board or deck portion of the vehicle may have a shape other than flat. For example, a deck portion and/or footpad may be concave, convex, or otherwise non-planar. Although a planar deck is described herein, with associated normal forces, similar functionality applies to non-planar arrangements.

During use of the vehicle, the rider's foot, indicated at 2540 in FIG. 28, may press down on unit 2508 with force applied by both heel and toe. In other words, force may be applied through force vectors 2536 and 2538 simultaneously. Accordingly, transducers 2512 and 2514 may both be activated, causing them to communicate respective rider-presence information signals to a motor controller associated with wheel assembly 2504. Reception of such signals by the motor controller may be configured to initiate active balancing of skateboard 2502.

Once skateboard 2502 is traveling at or above a selected threshold speed, the motor controller may continue sending drive signals to the motor (e.g., for continued active balancing) even if the motor controller receives a rider-not-present signal from one of the pressure-sensing transducers (i.e., transducer 2512 or 2514). Transducer 2512 and/or 2514 may be deactivated or cease sending a signal as a result of the rider removing pressure from the respective area of the footpad, e.g., by lifting a toe or heel portion of the foot. However, when skateboard 2502 is traveling below the selected threshold speed, the motor controller may be configured to bring the vehicle to rest (e.g., by de-energizing the motor) when one or more of the sensor transducers are deactivated (e.g., not pressed).

With reference to FIG. 27, a second rider detection unit 2542, substantially identical to first unit 2508, may be integrated into, coupled to, connected to, embedded in, or disposed on a second footpad 2544 of deck 2506. For example, unit 2542 may include first and second sensing transducers 2546 and 2548 encased in a waterproof enclosure 2550 having a vent 2552 configured to permit barometric equilibrium between an internal space and an external environment. Furthermore, unit 2542 may be sandwiched between a slip-resistant layer 2554, such as grip tape, and a relatively rigid board portion 2556 of deck 2506. All of these components are substantially similar to the corresponding components of first unit 2508. In some examples, second unit 2542 is absent.

In some embodiments, deactivation of a selected number (e.g., one) of the pressure-sensing transducers, or a predetermined configuration of selected transducers may be configured to bring the vehicle to rest when traveling below the threshold speed. In some embodiments, active balancing may be initialized when all of transducers 2512, 2514, 2546, 2548 (or other predetermined number or configuration thereof) are activated. In some embodiments, activation and/or deactivation of the transducers may be configured to modulate drive signals to the motor of wheel assembly 2504 via the motor controller when skateboard 2502 is traveling at or above the threshold speed.

Additional Illustrative Operational Method

Figure 29:
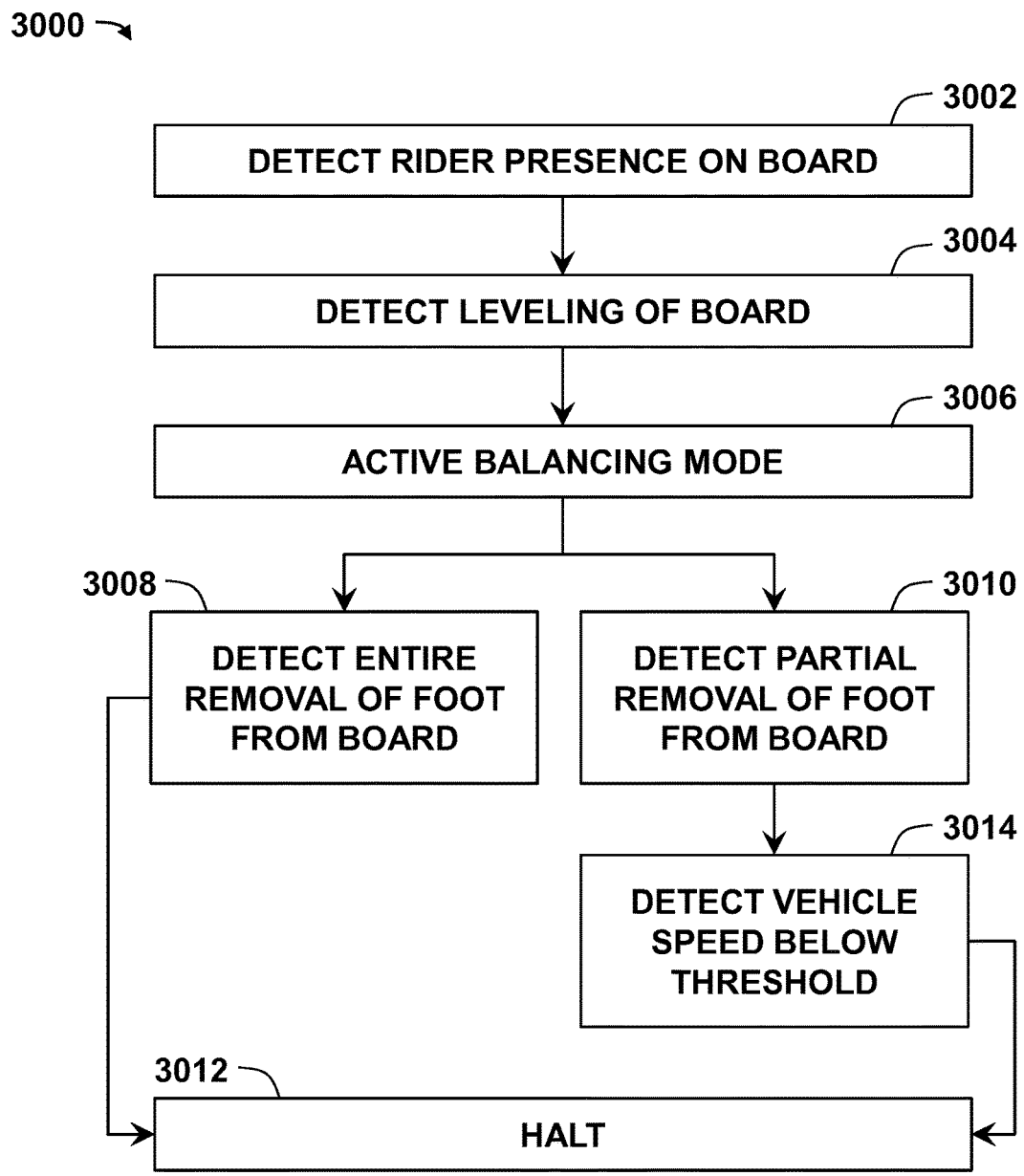
FIG. 29 is a flow chart depicting steps in an illustrative method of operation for an electrical vehicle having a rider detection system in accordance with aspects of the present disclosure.

This section describes an illustrative method for operating an electric vehicle such as vehicle 100 having a rider detection system such as system 2400; see FIG. 29. Aspects of rider detection devices and systems described above may be utilized in the method steps described below. Where appropriate, reference may be made to previously described components and systems that may be used in carrying out each step. These references are for illustration, and are not intended to limit the possible ways of carrying out any particular step of the method.

FIG. 29 is a flowchart illustrating steps performed in an illustrative method, and may not recite the complete process or all steps of the process. FIG. 29 depicts multiple steps of a method, generally indicated at 3000, which may be performed in conjunction with vehicles having rider detection systems according to aspects of the present disclosure. Although various steps of method 3000 are described below and depicted in FIG. 29, the steps need not necessarily all be performed, and in some cases may be performed in a different order than the order shown. Additionally, steps of method 3000 may be combined with one or more method steps described above with respect to system 2400 and/or method 600.

At step 3002, the control system of an electric vehicle, which may include a processor and/or controller, detects the presence of a rider on the electric vehicle. For simplicity, the electric vehicle will be referred to as a board. Any suitable vehicle may be used, such as vehicle 100 described above. Detection of the rider may be performed in any suitable manner. For example, the rider may be detected using one or more pressure-sensing transducers, such as transducer 2402. As explained above, such a pressure-sensing transducer may include a force-sensitive resistor (FSR), and may therefore have a proportional response to an applied force or pressure, such as the rider's foot. Furthermore, as described with respect to FIGS. 27-28, the transducer may include two sensing zones, one associated with a front or toe portion of the foot and another associated with a rear or heel portion of the foot. In this example, detection of rider presence does not change the status of an active balancing system on the vehicle.

At step 3004, the control system detects that the board has been substantially leveled. In other words, a tilt angle of the board has reached a state or range that is defined as "level" or "no longer at rest" by the system. For example, a rider may place both feet on the board and cause the foot deck to become generally parallel to the ground. Detection of board angle may be performed by any suitable method using any suitable sensor and/or detector, as described above with respect to FIGS. 5 and 6.

At step 3006, when the control system is satisfied that the rider is present and the board is in a level position, active balancing may be engaged. Active balancing and riding of the vehicle is described above, for example, with respect to method 600.

At steps 3008 and 3010, the system may detect a change in rider presence, and respond accordingly. At step 3008, the system may detect that the entire foot of the rider has been removed from the board. For example, the pressure sensors in both the toe zone and the heel zone of one foot pad may no longer be activated. In this case, the system may assume that the rider is no longer on the vehicle, and may halt the vehicle motor at step 3012, either immediately or after some selected delay. At step 3010, on the other hand, the system may detect that only a portion of the rider's foot has been removed from the board. For example, only the toe sensing zone or only the heel sensing zone may stop being activated. This may occur, for example, during a turn when a ride lifts his or her toes (or heels) to maintain balance. In response to this partial loss of rider detection, step 3014 includes checking the vehicle speed. If vehicle speed is above a selected threshold, the board will continue operating in active mode. If vehicle speed is below the threshold (e.g., three miles per hour), the system may halt vehicle operation at step 3012.

Although a single sensor region has been described, i.e., under a single foot, with multiple sub-zones, some examples may also use a second sensor region under the other foot of the rider. Any suitable combination of sensor regions and/or zones may be utilized. Additionally, any suitable type of sensor or transducer may be used, such as a FSR-type transducer and/or a fully conductive transducer.

Selected Examples and Embodiments

The following describes additional aspects and features of disclosed embodiments, presented without limitation as a series of numbered paragraphs. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some suitable combinations.

A. An electric vehicle comprising a board including first and second deck portions each configured to receive a left or right foot of a rider; a wheel assembly disposed between the first and second deck portions and including a ground-contacting element; a motor assembly mounted to the board and configured to rotate the ground-contacting element around an axle to propel the electric vehicle; at least one sensor configured to measure orientation information of the board; and a motor controller configured to receive orientation information measured by the sensor and to cause the motor assembly to propel the electric vehicle based on the orientation information; wherein the electric vehicle includes exactly one ground-contacting element.

A1. The vehicle of paragraph A, wherein the motor assembly includes a hub motor.

A2. The vehicle of paragraph A1, wherein the hub motor is internally geared.

A3. The vehicle of paragraph A1, wherein the hub motor is direct-drive.

A4. The vehicle of paragraph A, further comprising a first light assembly disposed at a first end portion of the board; and a second light assembly disposed at a second end portion of the board; wherein the first light assembly is configured to output light of a first color when the board is being propelled generally in a first direction and to output light of a second color when the board is being propelled generally in a second direction; and wherein the second light assembly is configured to output light of the second color when the board is being propelled generally in the first direction and to output light of the first color when the board is being propelled generally in the second direction.

A5. The vehicle of paragraph A4, wherein the first color is white and the second color is red.

A6. The vehicle of paragraph A, wherein the at least one sensor includes a gyro and an accelerometer collectively configured to estimate a lean angle of the board.

B. An electric skateboard comprising a foot deck having first and second deck portions each configured to support a rider's foot; exactly one ground-contacting wheel disposed between the first and second deck portions and configured to rotate about an axle to propel the skateboard; at least one sensor configured to measure an orientation of the foot deck;

and an electric motor configured to cause rotation of the wheel based on the orientation of the foot deck.

B1. The skateboard of paragraph B, wherein the motor is a hub motor.

B2. The skateboard of paragraph B, further comprising a first light assembly disposed at a distal end of the first deck portion; and a second light assembly disposed at a distal end of the second deck portion; wherein the first light assembly is configured to output light of a first color when the board is being propelled generally in a first direction and to output light of a second color when the board is being propelled generally in a second direction; and wherein the second light assembly is configured to output light of the second color when the board is being propelled generally in the first direction and to output light of the first color when the board is being propelled generally in the second direction.

B3. The skateboard of paragraph B, wherein the at least one sensor includes a gyro configured to measure pivotation of the foot deck about a pitch axis.

B4. The skateboard of paragraph B3, wherein the at least one sensor further includes an accelerometer, and wherein the gyro and the accelerometer are collectively configured to measure orientation of the foot deck about pitch, roll and yaw axes.

B5. The skateboard of paragraph B, further including a rider detection device configured to determine if a rider's feet are disposed on the foot deck, and to send a signal causing the motor to enter an active state when the rider's feet are determined to be disposed on the foot deck.

C. A self-balancing electric vehicle comprising a frame defining a plane; a first deck portion mounted to the frame and configured to support a first foot of a rider; a second deck portion mounted to the frame and configured to support a second foot of a rider; a wheel mounted to the frame between the deck portions, extending above and below the plane and configured to rotate about an axis lying in the plane; at least one sensor mounted to the frame and configured to sense orientation information of the frame; a motor controller configured to receive the orientation information from the sensor and to generate a motor control signal in response to the orientation information; and a motor configured to receive the motor control signal from the motor controller and to rotate the wheel in response, thus propelling the skateboard.

C1. The electric vehicle of paragraph C, wherein the motor is an electric direct-drive hub motor.

C2. The electric vehicle of paragraph C, wherein the at least one sensor includes a gyro and a 3-axis accelerometer collectively configured to sense orientation information sufficient to estimate a lean angle of the frame including pivotation about pitch, roll and yaw axes.

C3. The electric vehicle of paragraph C, further comprising a first skid pad and a first illuminator disposed at a distal end of the first deck portion and a second skid pad and a second illuminator disposed at a distal end of the second deck portion, wherein each skid pad includes an aperture configured to allow light from the corresponding illuminator to shine through while preventing the illuminator from contacting the ground.

C4. The electric vehicle of paragraph C3, wherein the first illuminator is configured to output light of a first color when the frame is being propelled generally in a first direction and to output light of a second color when the frame is being propelled generally in a second direction, and wherein the second illuminator is configured to output light of the second color when the frame is being propelled generally in the first direction and to output light of the first color when the frame is being propelled generally in the second direction.

C5. The electric vehicle of paragraph C, further comprising a fender attached to at least one of the deck portions and configured to prevent water traversed by the wheel from splashing onto a rider.

C6. The electric vehicle of paragraph C5, wherein the fender is attached to both of the first and second deck portions and substantially entirely separates the wheel from the rider.

D0. An electric vehicle, comprising:
a board including first and second deck portions each configured to receive a left or right foot of a rider oriented generally perpendicular to a longitudinal axis of the board;
a wheel assembly including a ground-contacting element disposed between and extending above the first and second deck portions;
a motor assembly mounted to the board and configured to rotate the ground-contacting element around an axle to propel the electric vehicle;
at least one orientation sensor configured to measure orientation information of the board;
a first sensing region disposed in the first deck portion, the first sensing region including a first pressure-sensing transducer; and
a motor controller configured to receive board orientation information measured by the orientation sensor and rider presence information based on an output of the first pressure-sensing transducer, and to cause the motor assembly to propel the electric vehicle based on the board orientation information and the rider presence information.

D1. The vehicle of paragraph D0, wherein the first sensing region further includes a second pressure-sensing transducer adjacent to and laterally spaced from the first pressure-sensing transducer, such that the first pressure-sensing transducer and the second pressure-sensing transducer are configured to be disposed beneath a front portion and a rear portion, respectively, of the left or right foot of the rider.

D2. The vehicle of any of paragraphs D0 through D1, wherein the first pressure-sensing transducer is embedded in an upper surface of the first deck portion.

D3. The vehicle of paragraph D2, wherein the first pressure-sensing transducer is sandwiched between a slip-resistant layer and a rigid layer of the first deck portion.

D4. The vehicle of any of paragraphs D0 through D3, wherein the first pressure-sensing transducer is encased in a waterproof enclosure.

D5. The vehicle of paragraph D4, wherein the waterproof enclosure includes an air-permeable, water-resistant vent.

D6. The vehicle of any of paragraphs D0 through D5, wherein the first pressure-sensing transducer comprises a force-sensitive resistor.

D7. The vehicle of any of paragraphs D0 through D6, wherein the first pressure-sensitive transducer comprises a resilient first conductive layer spaced from and facing a second conductive layer, such that a force applied to the first conductive layer causes the first conductive layer to contact the second conductive layer.

E0. An electric skateboard, comprising:
a foot deck having first and second deck portions each configured to support a rider's foot oriented generally perpendicular to a longitudinal axis of the foot deck;
exactly one ground-contacting wheel disposed between and extending above the first and second deck portions and configured to rotate about an axle to propel the skateboard;
at least one orientation sensor configured to measure an orientation of the foot deck;

a pressure-sensing transducer disposed on the first deck portion; and an electric motor configured to cause rotation of the wheel based on the orientation of the foot deck and an output of the pressure-sensing transducer.

E1. The skateboard of paragraph E0, wherein the pressure-sensing transducer comprises a spacer layer disposed between a force-sensitive resistor layer and an electrical circuit layer.

E2. The skateboard of paragraph E0, wherein the pressure-sensing transducer comprises a spacer layer disposed between an electrically conductive layer and a partially electrically conductive layer having a conductivity proportional to a force applied thereon.

E3. The skateboard of any of paragraphs E0 through E2, wherein the pressure-sensing transducer comprises a resilient first conductive layer spaced from and facing a second conductive layer, such that the first conductive layer is displaceable to electrically contact the second conductive layer, thereby producing the output of the pressure-sensing transducer.

E4. The skateboard of any of paragraphs E0 through E3, wherein the pressure-sensing transducer is in communication with a motor controller configured to control the electric motor.

E5. The skateboard of paragraph E4, further including a speed sensor configured to provide wheel speed information to the motor controller, wherein the motor controller is configured to control the motor based on the output of the pressure-sensing transducer and the wheel speed information.

E6. The skateboard of any of paragraphs E0 through E5, wherein the pressure-sensing transducer is encased in a waterproof enclosure.

E7. The skateboard of any of paragraphs E0 through E6, wherein the pressure-sensing transducer includes a force-sensitive resistor.

F0. A self-balancing electric vehicle, comprising:

a frame defining a plane and having a longitudinal axis;

a first deck portion mounted to the frame and configured to support a first foot of a rider oriented generally perpendicular to the longitudinal axis of the frame;

a second deck portion mounted to the frame and configured to support a second foot of a rider oriented generally perpendicular to the longitudinal axis of the frame;

a wheel mounted to the frame between the deck portions, extending above and below the plane and configured to rotate about an axis lying in the plane;

at least one orientation sensor mounted to the frame and configured to sense orientation information of the frame;

a pressure-sensing transducer disposed on the first deck portion and configured to sense rider presence information based on a force applied to the first deck portion;

a motor controller configured to receive the orientation information and the rider presence information and to generate a motor control signal in response; and a motor configured to receive the motor control signal from the motor controller and to rotate the wheel in response, thereby propelling the skateboard.

F1. The electric vehicle of paragraph F0, wherein the motor controller is configured to permit motor rotation when the pressure-sensing transducer senses that the force is presently applied to the first deck portion.

F2. The electric vehicle of any of paragraphs F0 through F1, wherein the pressure-sensing transducer is a first pressure-sensing transducer, the vehicle further comprising a second pressure-sensing transducer laterally adjacent to the first pressure-sensing transducer, wherein the first and the second pressure-sensing transducers comprise a first discrete sensing zone and a second discrete sensing zone, respectively.

F3. The electric vehicle of any of paragraphs F0 through F2, wherein the pressure-sensing transducer includes at least one partially electrically conductive layer.

F4. The electric vehicle of paragraph F3, wherein the pressure-sensing transducer comprises a force-sensitive resistor.

F5. The electric vehicle of any of paragraphs F0 through F4, wherein the pressure-sensing transducer is encased in a waterproof enclosure.

F6. The electric vehicle of any of paragraphs F0 through F5, wherein the pressure-sensing transducer is sandwiched between an upper slip-resistant layer and a rigid portion of the first deck portion.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the examples includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electric vehicle, comprising:
   a board including first and second deck portions each configured to receive a left or right foot of a rider oriented generally perpendicular to a longitudinal axis of the board;
   a wheel assembly including a ground-contacting element disposed between and extending above the first and second deck portions;
   a motor assembly mounted to the board and configured to rotate the ground-contacting element around an axle to propel the electric vehicle;
   at least one orientation sensor configured to measure orientation information of the board;
   a sensing region disposed within one of the deck portions and including two pressure-sensing transducers laterally spaced from each other, such that a first of the two pressure-sensing transducers registers with a first portion of the foot of the rider and a second of the two pressure-sensing transducers registers with a second portion of the same foot of the rider; and
   a motor controller configured to receive board orientation information measured by the orientation sensor and rider presence information based on outputs of the two pressure-sensing transducers, and to cause the motor assembly to propel the electric vehicle based on the board orientation information and the rider presence information;

wherein the motor controller is further configured to halt the motor assembly in response to activation of exactly zero of the two pressure-sensing transducers.

2. The vehicle of claim 1, wherein the two pressure-sensing transducers are configured to be disposed beneath a front portion and a rear portion, respectively, of the same foot of the rider.

3. The vehicle of claim 1, wherein the transducers are embedded in an upper surface of the first deck portion.

4. The vehicle of claim 3, wherein the transducers are sandwiched between a slip-resistant layer and a rigid layer of the first deck portion.

5. The vehicle of claim 1, wherein the transducers are encased in a waterproof enclosure.

6. The vehicle of claim 5, wherein the waterproof enclosure includes an air-permeable, water-resistant vent.

7. An electric skateboard, comprising:
a foot deck having first and second deck portions each configured to support a rider's foot oriented generally perpendicular to a longitudinal axis of the foot deck;
exactly one ground-contacting wheel disposed between and extending above the first and second deck portions and configured to rotate about an axle to propel the electric skateboard;
at least one orientation sensor configured to measure an orientation of the foot deck;
a sensing region disposed in the first deck portion, the sensing region including two pressure-sensing transducers laterally spaced from each other, such that a first of the two pressure-sensing transducers registers with a first portion of one foot of the rider and a second of the two pressure-sensing transducers registers with a second portion of the one foot of the rider; and
an electric motor configured to cause rotation of the ground-contacting wheel based on the orientation of the foot deck and an output of the sensing region;
wherein the electric motor is configured to halt in response to activation of exactly zero of the two pressure-sensing transducers.

8. The electric skateboard of claim 7, wherein each of the two pressure-sensing transducers comprises a spacer layer disposed between a first electrically conductive layer and a second electrically conductive layer.

9. The electric skateboard of claim 8, wherein the first conductive layer is displaceable to electrically contact the second conductive layer.

10. The electric skateboard of claim 7, wherein the sensing region is in communication with a motor controller configured to control the electric motor.

11. The electric skateboard of claim 10, further comprising a speed sensor configured to provide wheel speed information to the motor controller, wherein the motor controller is configured to control the motor based on the output of the sensing region and the wheel speed information.

12. A self-balancing electric vehicle, comprising:
a frame defining a plane and having a longitudinal axis;
a first deck portion mounted to the frame and configured to support a first foot of a rider oriented generally perpendicular to the longitudinal axis of the frame;
a second deck portion mounted to the frame and configured to support a second foot of a rider oriented generally perpendicular to the longitudinal axis of the frame;
a wheel mounted to the frame between the deck portions, extending above and below the plane and configured to rotate about an axis parallel to the plane, the wheel extending laterally across at least a majority of a width of the first deck portion;
at least one orientation sensor mounted to the frame and configured to sense orientation information of the frame;
a pair of pressure sensing transducers disposed on the first deck portion and arranged such that a first of the pressure-sensing transducers registers with a first portion of the first foot of the rider and a second of the pressure-sensing transducers registers with a second portion of the first foot of the rider, the first and second pressure-sensing transducers configured to sense rider presence information based on one or more forces applied to the first deck portion;
a motor controller configured to receive the orientation information and the rider presence information and to generate a motor control signal in response; and
a motor configured to receive the motor control signal from the motor controller and to rotate the wheel in response, thereby propelling the electric vehicle;
wherein the motor controller is further configured to halt the motor assembly in response to activation of exactly zero of the pressure-sensing transducers.

13. The self-balancing electric vehicle of claim 12, wherein each pressure sensing transducer responds to rider absence by generating no electrical signal.

14. The self-balancing electric vehicle of claim 12, wherein each pressure sensing transducer responds to rider presence by generating a predetermined electrical signal.

15. The self-balancing electric vehicle of claim 12, wherein each transducer is embedded in an upper surface of the first deck portion.

16. The self-balancing electric vehicle of claim 15, wherein each transducer is sandwiched between a slip-resistant layer and a rigid layer of the first deck portion.

17. The self-balancing electric vehicle of claim 12, wherein each transducer is encased in a waterproof enclosure.

18. The self-balancing electric vehicle of claim 17, wherein the waterproof enclosure includes an air-permeable, water-resistant vent.

19. The self-balancing electric vehicle of claim 12, further comprising a speed sensor configured to provide wheel speed information to the motor controller, wherein the motor controller is configured to control the motor based on the output of the pressure sensing transducers and the wheel speed information.

20. The self-balancing electric vehicle of claim 19, wherein the motor controller is configured to halt the motor assembly in response to activation of exactly zero of the two pressure-sensing transducers only when a speed of the electric vehicle is below a threshold value.

* * * * *